(12) United States Patent
Hattori et al.

(10) Patent No.: US 11,086,100 B2
(45) Date of Patent: Aug. 10, 2021

(54) MIRROR SUPPORT AND MIRROR SUPPORT MECHANISM

(71) Applicant: Mitsubishi Electric Corporation, Chiyoda-ku (JP)

(72) Inventors: Tomoya Hattori, Chiyoda-ku (JP); Koji Hirose, Chiyoda-ku (JP); Teppei Ikezaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/755,989

(22) PCT Filed: Nov. 9, 2018

(86) PCT No.: PCT/JP2018/041657
§ 371 (c)(1),
(2) Date: Apr. 14, 2020

(87) PCT Pub. No.: WO2019/116799
PCT Pub. Date: Jun. 20, 2019

(65) Prior Publication Data
US 2020/0257076 A1    Aug. 13, 2020

(30) Foreign Application Priority Data

Dec. 14, 2017    (JP) .............................. JP2017-239497

(51) Int. Cl.
*G02B 7/192*    (2021.01)
*G02B 7/198*    (2021.01)
*G02B 23/02*    (2006.01)

(52) U.S. Cl.
CPC ............. *G02B 7/192* (2013.01); *G02B 7/198* (2013.01); *G02B 23/02* (2013.01)

(58) Field of Classification Search
CPC ........ G02B 23/02; G02B 7/183; G02B 7/192; G02B 7/198
(Continued)

(56) References Cited

U.S. PATENT DOCUMENTS 5,877,906 A * 3/1999 Nagasawa ............ G11B 15/026
360/15
2002/0176094 A1    11/2002 Petasch et al.
(Continued)

FOREIGN PATENT DOCUMENTS

JP    7-140396 A    6/1995
JP    2002-350699 A    12/2002
(Continued)

OTHER PUBLICATIONS

International Search Report dated Feb. 12, 2019 in PCT/JP2018/041657 filed Nov. 9, 2018.

*Primary Examiner* — Joseph P Martinez
*Assistant Examiner* — Vipin Patel
(74) *Attorney, Agent, or Firm* — Oblon, McClelland, Maier & Neustadt, L.L.P.

(57) ABSTRACT

A mirror support includes a first rod in which one end is connected to an arm at a position closer to a side of a first pad fixed to the mirror with respect to a second pad fixed to the mirror while the other end stretched and inclined onto the side of first pad from the position connected is connected to a support structure; a first-rod elastic body that is an elastic body constituting the first rod; a second rod in which one end is connected to arm at a position closer to a side of second pad with respect to first pad while the other end stretched and inclined onto the side of second pad from the position connected is connected to the support structure; and a second-rod elastic body that is an elastic body constituting the second rod.

16 Claims, 19 Drawing Sheets

(58) Field of Classification Search
USPC .......... 359/811, 908, 838–884, 212.1–214.1,
359/223.1–224.1
See application file for complete search history.

(56) References Cited

U.S. PATENT DOCUMENTS

| | | |
|---|---|---|
| 2004/0189969 A1 | 9/2004 | Mizuno |
| 2005/0088734 A1* | 4/2005 | Basu ...................... G02B 7/183 359/399 |
| 2007/0097473 A1 | 5/2007 | Oshima et al. |
| 2008/0204674 A1 | 8/2008 | Imoto |
| 2009/0231735 A1 | 9/2009 | Torii |
| 2011/0094502 A1* | 4/2011 | Reynolds ........... G02B 19/0042 126/684 |
| 2015/0077874 A1* | 3/2015 | Naepflin ................ G02B 7/183 359/872 |
| 2016/0226437 A1* | 8/2016 | Tam Aura ............. F24S 30/455 |

FOREIGN PATENT DOCUMENTS

| | | |
|---|---|---|
| JP | 2004-281644 A | 10/2004 |
| JP | 2008-210867 A | 9/2008 |
| JP | 2009-217150 A | 9/2009 |
| JP | 2012-185278 A | 9/2012 |
| JP | 2014-10332 A | 1/2014 |
| JP | 2015-79221 A | 4/2015 |
| JP | 2017-32795 A | 2/2017 |
| WO | WO 2006/018888 A1 | 2/2006 |

\* cited by examiner (a)

(b)

(a)

(b)

(a)

(b)

(a)

(b)

(a)

(b)

(a)

(b)

(c)

(d)

MIRROR SUPPORT AND MIRROR SUPPORT MECHANISM

TECHNICAL FIELD

The present invention relates to a mirror support and a mirror support mechanism for supporting a mirror (reflecting mirror of a primary mirror or a secondary mirror) of an optical telescope or a radio telescope.

BACKGROUND ART

Conventionally, in some mirror supports and mirror support mechanisms that support the mirror of a telescope, center lines of two legs of a bipod intersect with each other at a center of gravity in an axial direction of the reflecting mirror (for example, PTL 1). On the other hand, there is a mirror support and a mirror support mechanism that support the mirror of the telescope with an inverted bipod (for example, see PTL 2).

Some mirror supports and mirror support mechanisms support the axial direction and a lateral (side) direction (for example, see PTL 3). PTL 3 discloses one in which the lateral direction is restrained (supported) by an elastic body. The elastic body is frequently used to hold (support) an optical element (for example, see PTL 4).

CITATION LIST

Patent Literature

PTL 1: WO2006/018888 A
PTL 2: Japanese Patent Laying-Open No. 2017-32795
PTL 3: Japanese Patent Laying-Open No. 2012-185278
PTL 4: Japanese Patent Laying-Open No. 2009-217150

SUMMARY OF INVENTION

Technical Problem

However, in a large telescope that is installed under such gravity that deformation of the mirror (the reflecting mirror of the primary mirror of the secondary mirror) of the telescope due to an own weight cannot be ignored, an auxiliary mechanism is frequently required for the mirror support and the mirror support mechanism in which the bipod or the inverted bipod is used. For example, it is considered that the mirror support and the mirror support mechanism support the axial direction and the lateral direction. For these reasons, conventionally, there is a possibility that an entire structure of the mirror support and the mirror support mechanism becomes complicated or a weight is increased.

The present invention has been made in order to solve the above problem, and relates to a mirror support and a mirror support mechanism for being capable of supporting the mirror (the reflecting mirror of the primary mirror or the secondary mirror) of the telescope while suppressing the deformation due to the own weight with a simple structure.

Solution to Problem

According to a mirror support and a mirror support mechanism of the present invention, the mirror support installed between a mirror and a support structure and in an optical axis direction of the mirror to support the mirror, the mirror support includes: a first pad fixed to the mirror; a second pad fixed to the mirror at a position different from the first pad; an arm laid between the first pad and the second pad while separated from the mirror; a first-pad elastic body formed between the arm and the first pad; a second-pad elastic body formed between the arm and the second pad; a first rod in which one end is connected to the arm at a position closer to a side of the first pad with respect to the second pad while the other end stretched and inclined onto the side of the first pad from the position connected is connected to the support structure; a first-rod elastic body that is an elastic body constituting the first rod; a second rod in which one end is connected to the arm at a position closer to a side of the second pad with respect to the first pad while the other end stretched and inclined onto the side of the second pad from the position connected is connected to the support structure; and a second-rod elastic body that is an elastic body constituting the second rod, in which inclination angles of the first rod and the second rod are an angle at which a point where a first virtual line obtained by stretching the first rod in a direction of the mirror and a second virtual line obtained by stretching the second rod in the direction of the mirror intersect with each other exists on a virtual plane in which a center of gravity of the mirror is located.

According to the present invention, a mirror support mechanism includes: a mirror; a mirror fixing unit fixing at least six locations at equal intervals on an identical circumference of the mirror; and a support structure supporting the mirror fixing unit, in which the support structure includes a rectangular main body, first connectors formed on each of long sides of two ends in a long side direction of the main body, and second connectors formed on each of two short sides of the main body, and each of the first connectors and each of the second connectors support the mirror fixing unit.

Advantageous Effects of Invention

As described above, according to the present invention, the mirror support and the mirror support mechanism for being capable of supporting the mirror (the reflecting mirror of the primary mirror and the secondary mirror) by decreasing the rigid movement of the mirror can be obtained.

DESCRIPTION OF EMBODIMENTS

Figure 1:
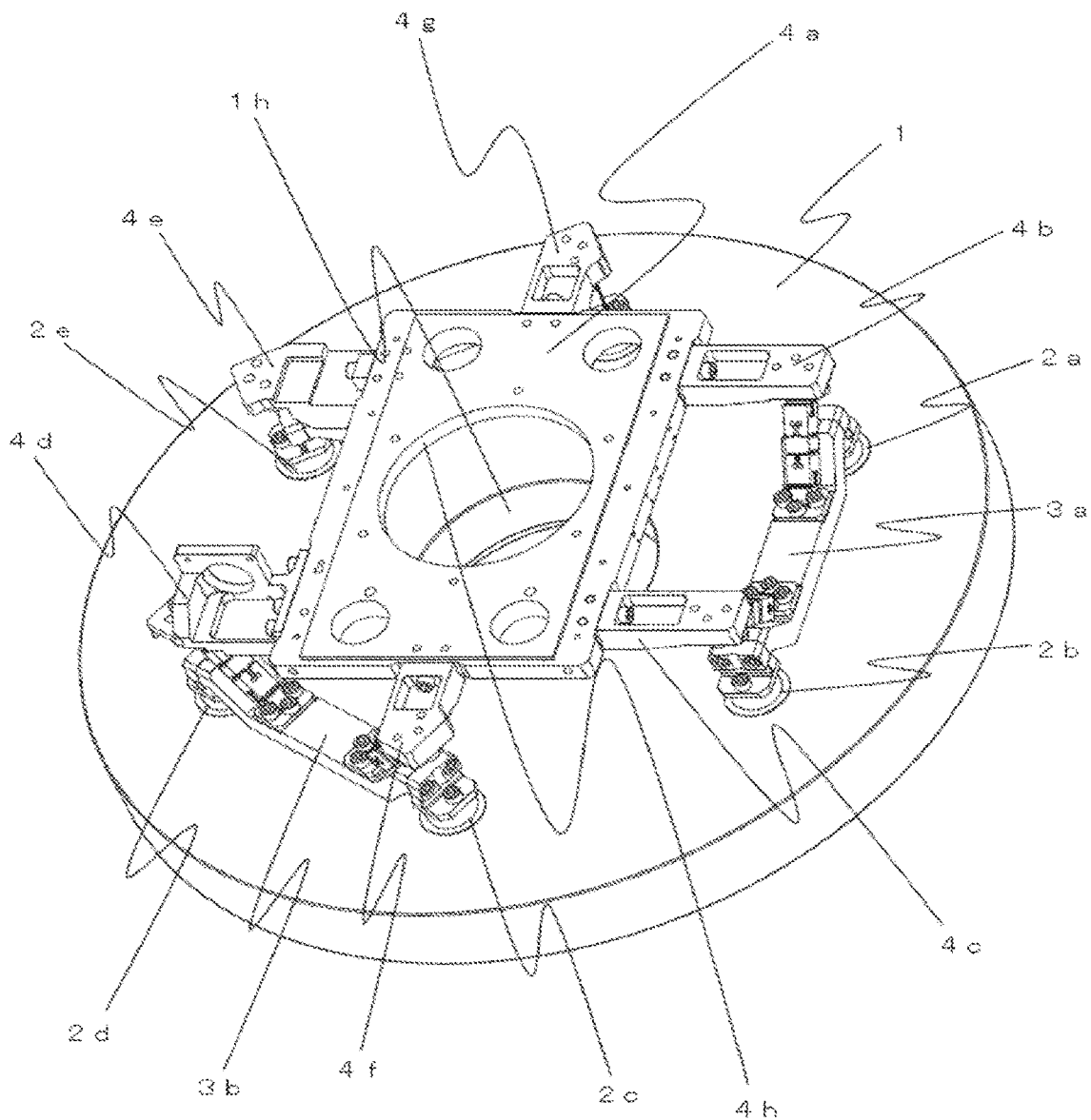
FIG. 1 is a perspective view illustrating a mirror support mechanism according to a first embodiment of the present invention (a perspective view as seen from a back surface side of a mirror).

The present invention relates to a mirror support (mirror fixing unit) and a mirror support mechanism (the mirror support (mirror fixing unit) and a support structure), which are installed between a mirror and the support structure and in an optical axis direction of the mirror to support the mirror. The mirror supported by the mirror support and the mirror support mechanism supports a mirror (a reflecting mirror of a primary mirror and a secondary mirror) of an optical telescope and a radio telescope. The case where the mirror (reflecting mirror) supported by the mirror support and the mirror support mechanism is the secondary mirror is exemplified in embodiments of the present invention. The entire mirror support mechanism (the mirror support (mirror fixing unit) and the support structure) will be described first with the case of the secondary mirror as an example. The mirror support (mirror fixing unit) will be described after that. The detailed description and the illustration of the entire telescope and the primary mirror will be omitted. In the drawings, the same reference numerals denote the same or corresponding parts, and the detailed description thereof will be omitted. Each coordinate in the drawings is as follows. An X-axis is an axis in a direction of an altitude axis direction of a mirror. A Y-axis is an axis in a vertical axis direction of the mirror. A Z-axis is an axis in an optical axis direction of the mirror. The X-axis, the Y-axis, and the Z-axis are orthogonal to one another. An R-axis is the axis in a radial direction of the mirror. A C-axis is the axis in a circumferential direction of the mirror. The R-axis, the C-axis, and the Z-axis are orthogonal to one another.

First Embodiment

Figure 2:
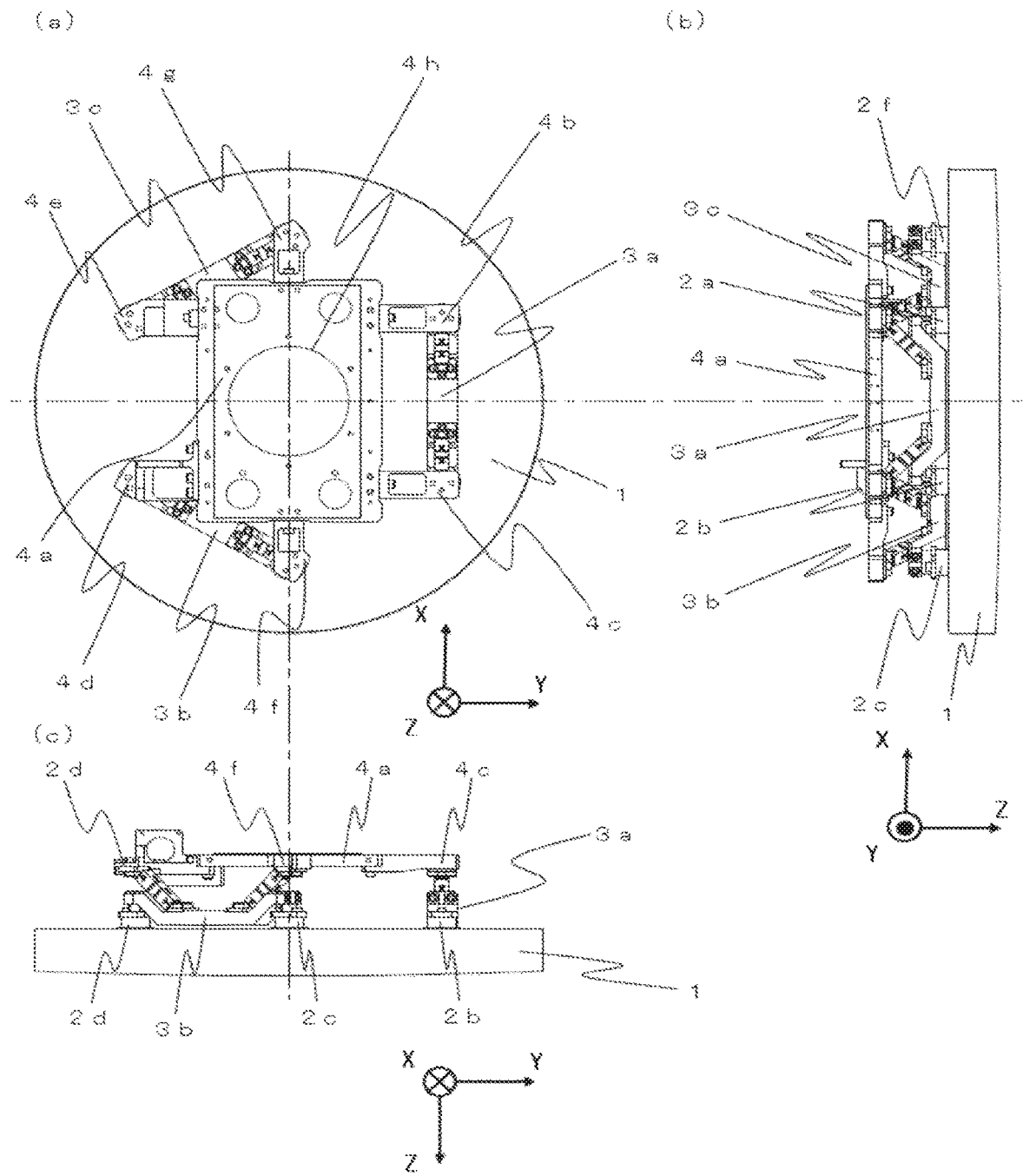
FIG. 2 is a plan view, a front view, and a side view illustrating the mirror support mechanism of the first embodiment of the present invention.
Figure 3:
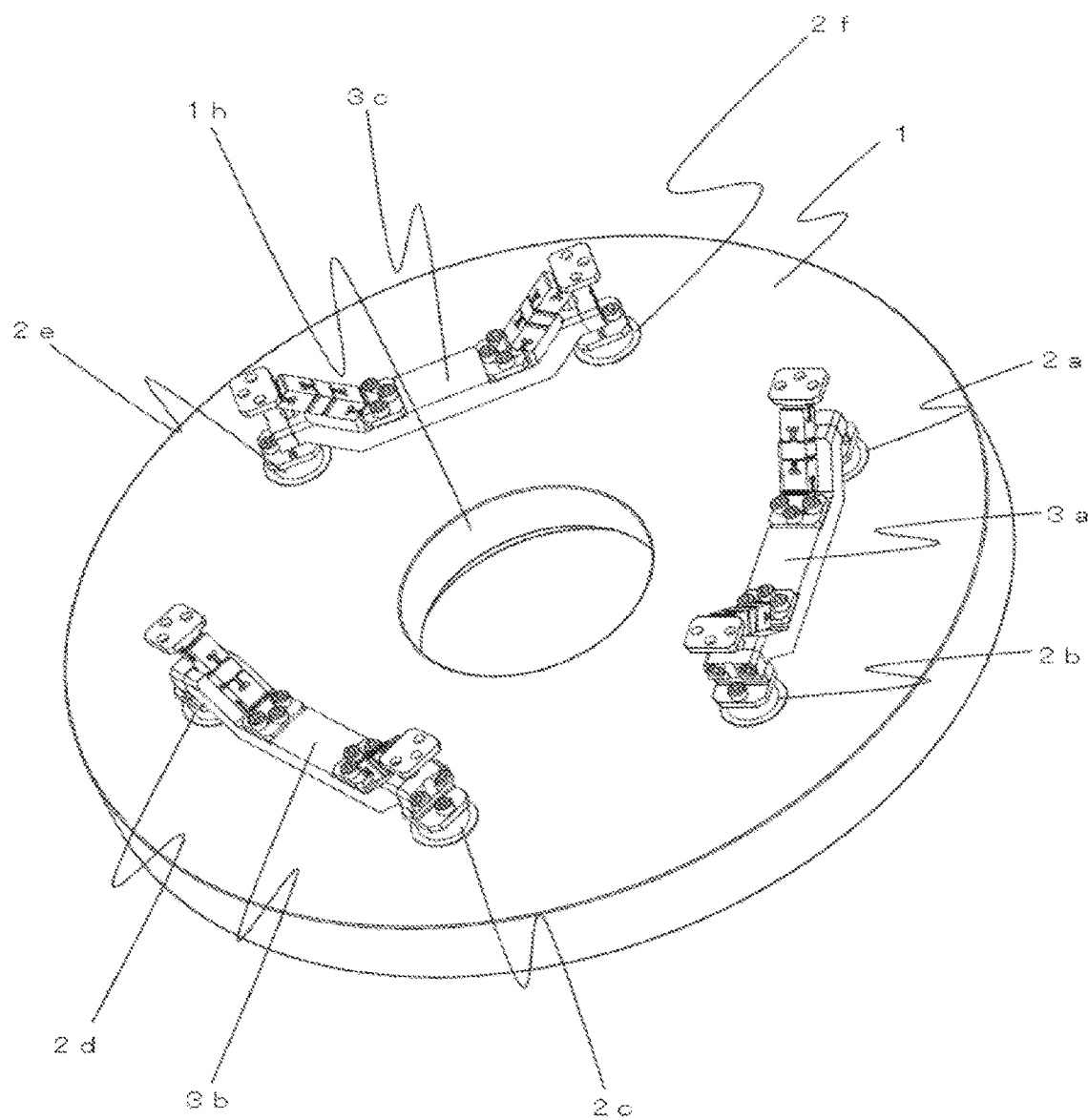
FIG. 3 is a perspective view illustrating the mirror support mechanism of the first embodiment of the present invention (a perspective view as seen from the back surface side of the mirror) (before a support structure is attached).
Figure 4:
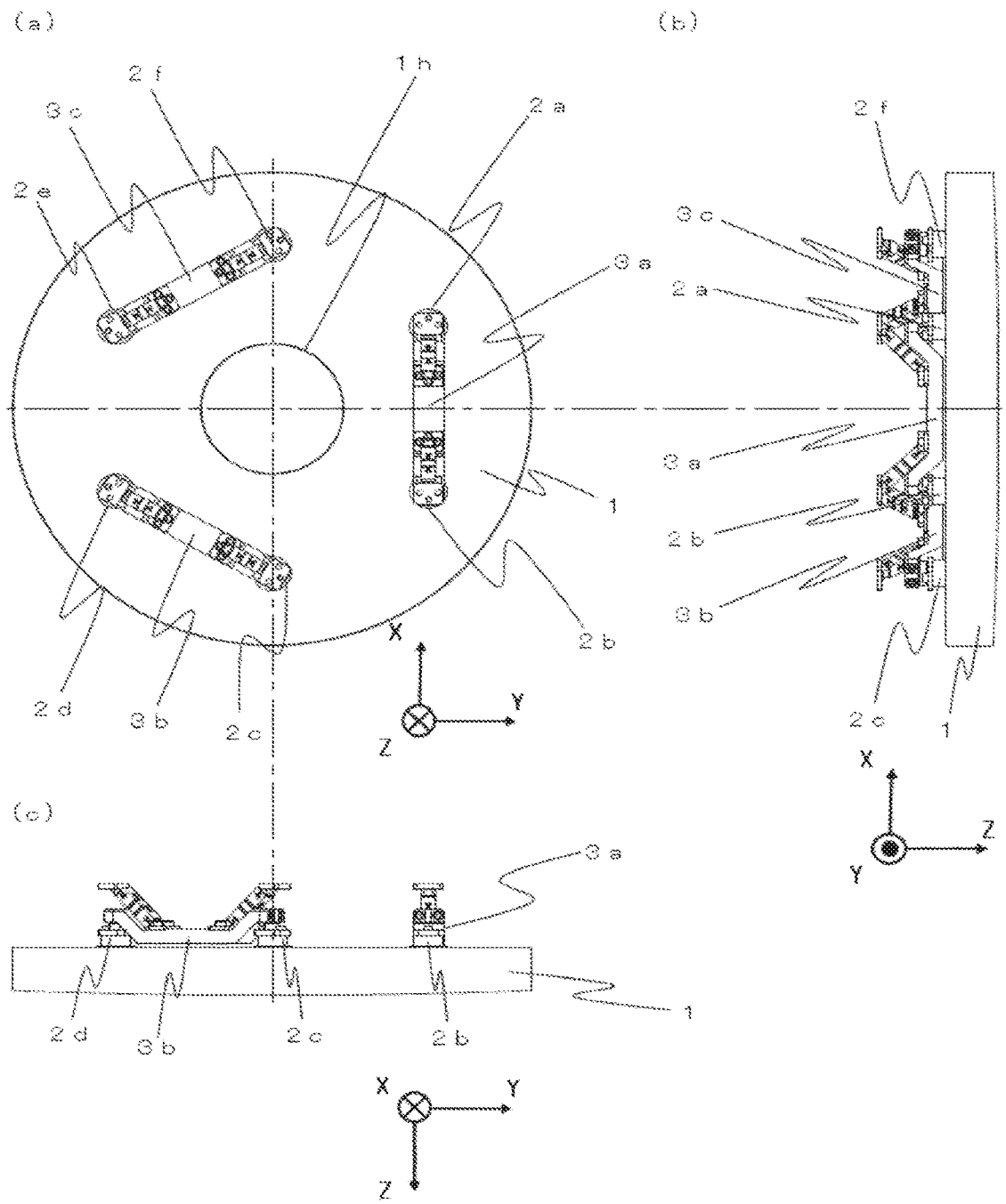
FIG. 4 is a plan view, a front view, and a side view illustrating the mirror support mechanism of the first embodiment of the present invention (before the support structure is attached).

Hereinafter, a mirror support and a mirror support mechanism according to a first embodiment of the present invention will be described with reference to FIGS. 1 to 9. FIG. 2(*a*) is a plan view of the mirror support mechanism. Since the mirror support mechanism has a main configuration on a back surface of a mirror (a rear surface, a surface opposite to a mirror surface), the back surface of the mirror is set to a plan view. That is, a bottom view of the mirror support mechanism becomes the mirror surface of the mirror. FIG. 2(*b*) is a front view of the mirror support mechanism. A rear view of the mirror support mechanism is clear from FIGS. 1 and 2. FIG. 2(*c*) is a side view of the mirror support mechanism. The right side view and the left side view of the mirror support mechanism become similar, and a difference between the right side view and the left side view is clear from FIGS. 1 and 2. A relationship among FIGS. 4(*a*), 4(*b*) and 4(*c*) is identical to a relationship among FIGS. 2(*a*), 2(*b*) and 2(*c*). That is, FIG. 4(*a*) is a plan view of the mirror support mechanism. As in FIG. 2, the bottom view of the mirror support mechanism becomes the mirror surface of the mirror. FIG. 4(*b*) is the front view of the mirror support mechanism. The rear view of the mirror support mechanism is clear from FIGS. 3 and 4. FIG. 4(*c*) is the side view of the mirror support mechanism. The right side view and the left side view of the mirror support mechanism are similar, and the difference between the right side view and the left side view is clear from FIGS. 3 and 4.

Figure 5:
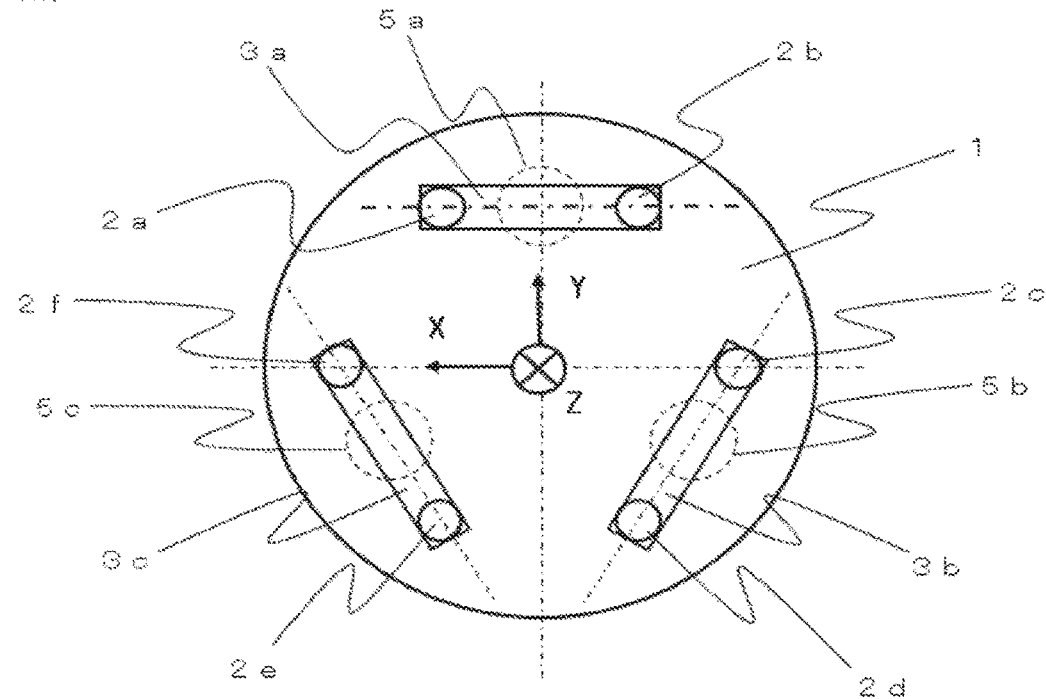
FIG. 5 is a schematic plan view illustrating a mirror support and a mirror of the first embodiment of the present invention.
Figure 5:
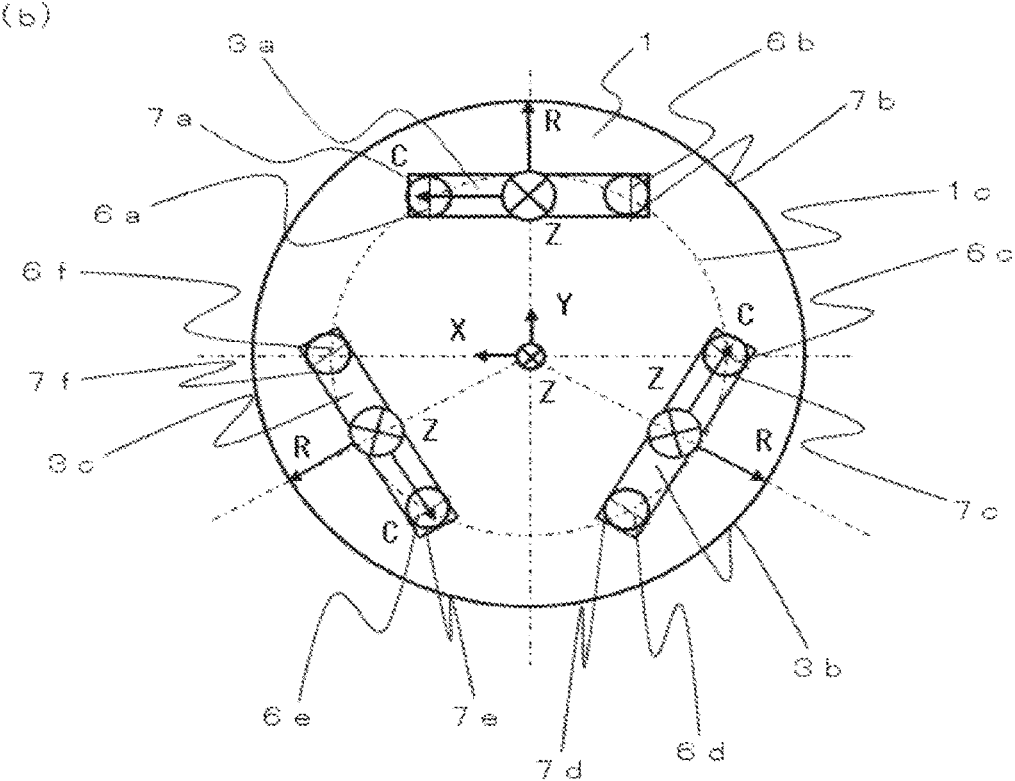
Figure 7:
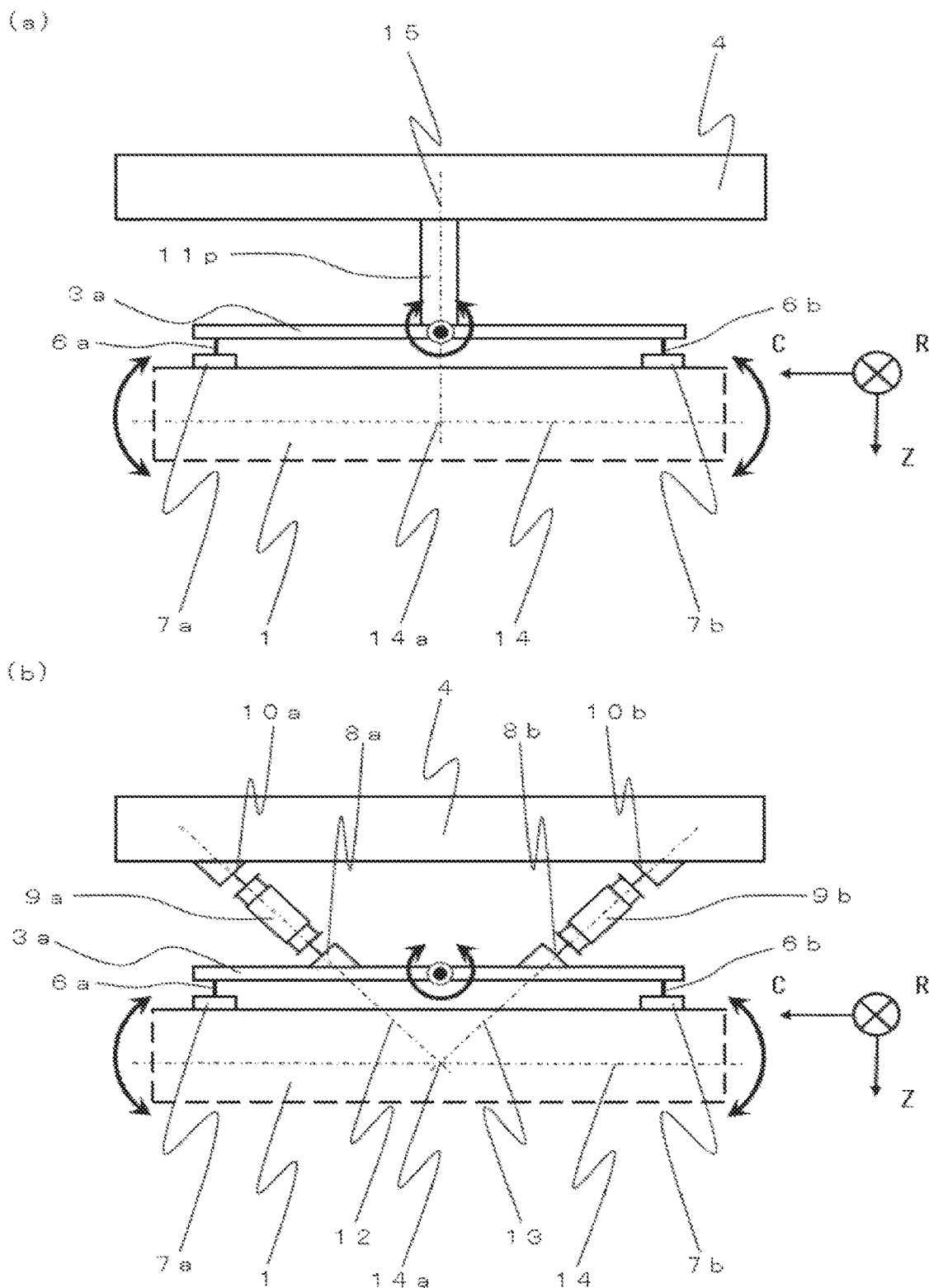
FIG. 7 is a schematic front view illustrating the mirror support mechanism of the first embodiment of the present invention.
Figure 8:
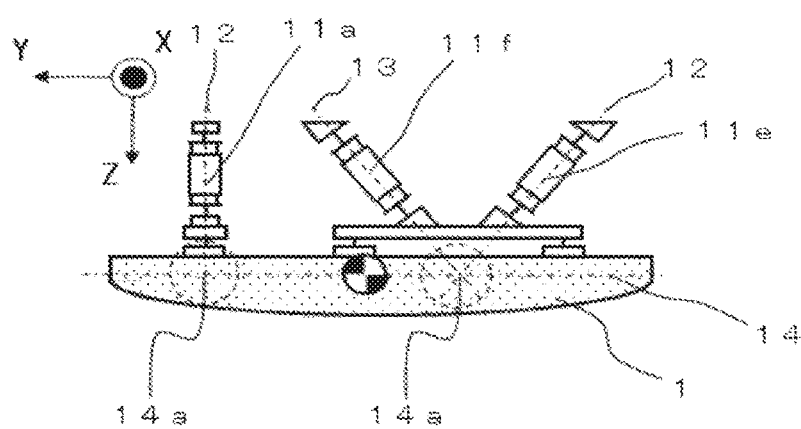
FIG. 8 is a schematic front view illustrating the mirror support and the mirror of the first embodiment of the present invention.
Figure 8:
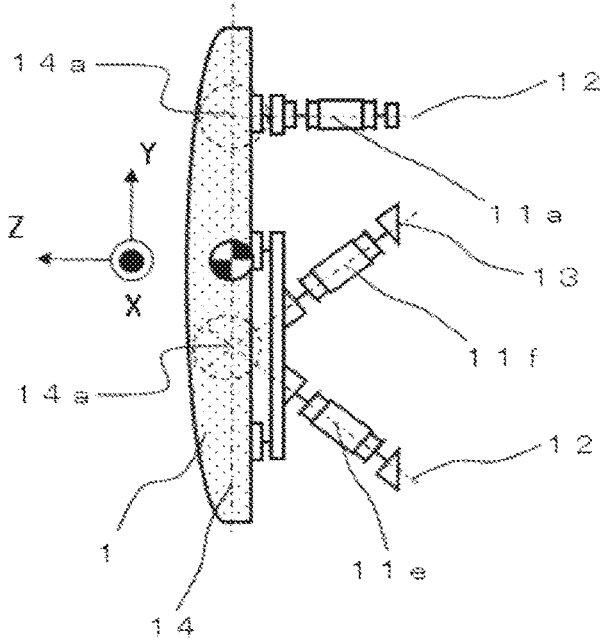
Figure 9:
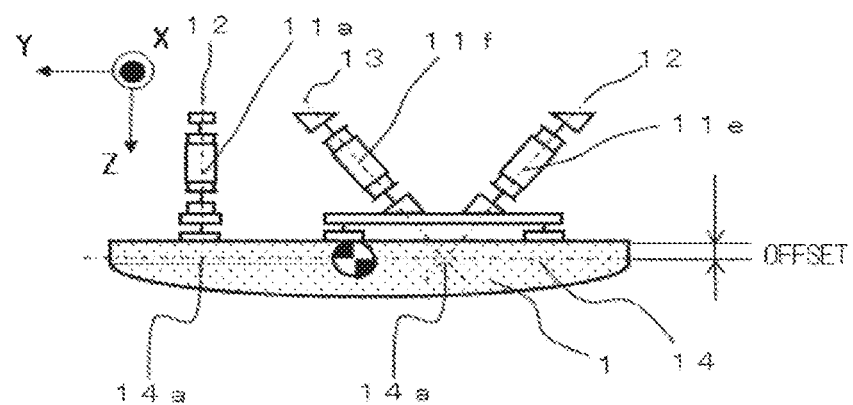
FIG. 9 is a schematic front view illustrating the mirror support and the mirror of the first embodiment of the present invention.
Figure 9:
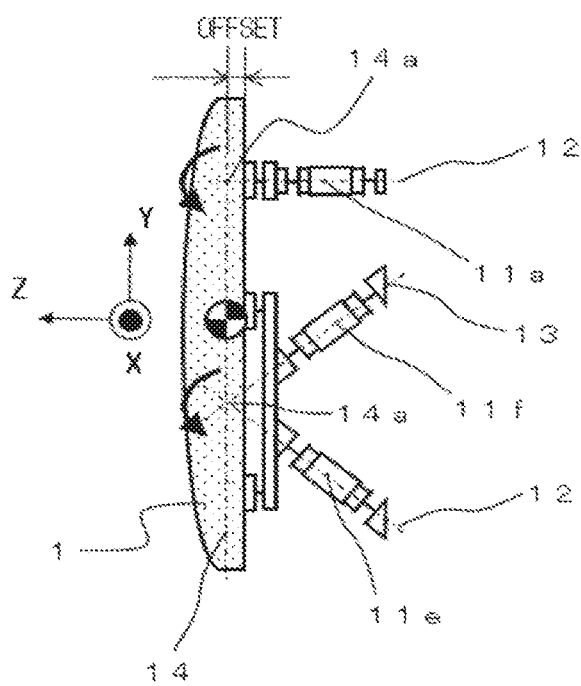
Figure 10:
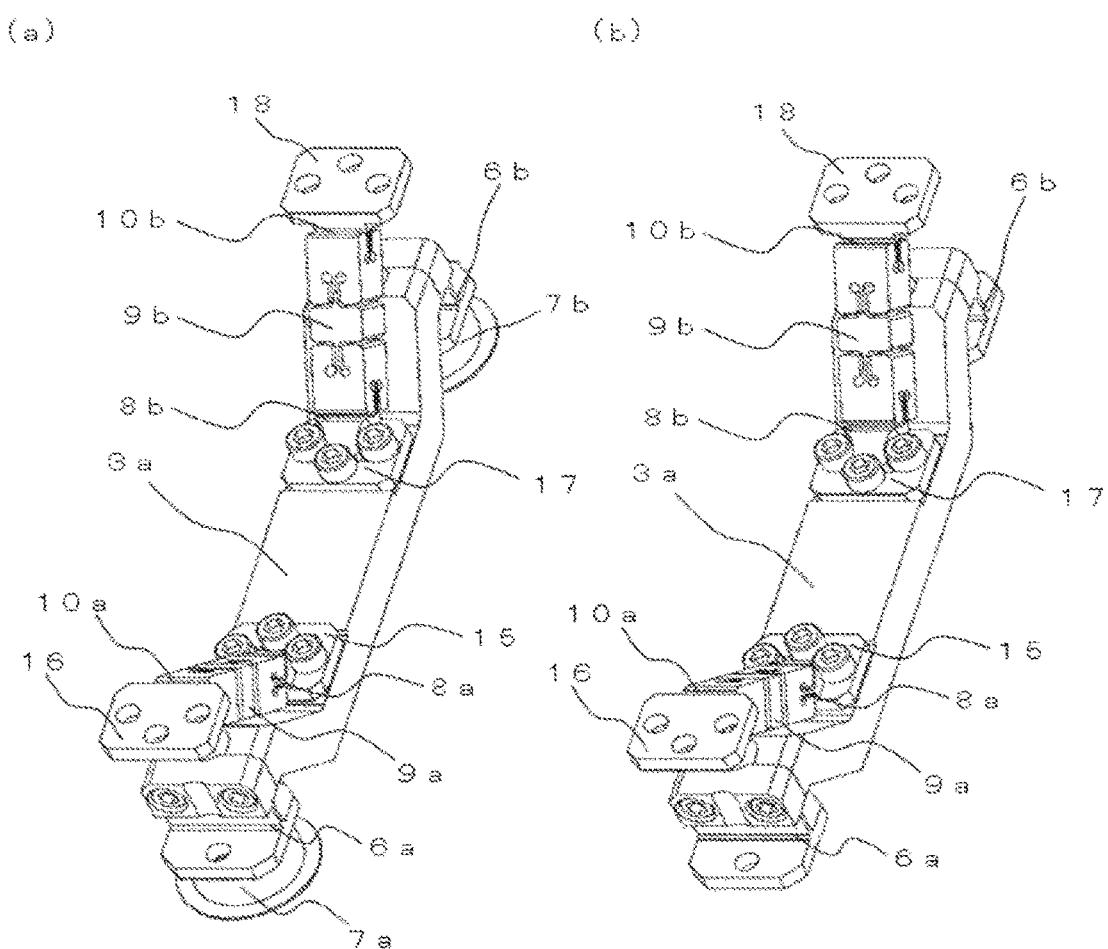
FIG. 10 is a perspective view illustrating the mirror support of the first embodiment of the present invention.
Figure 11:
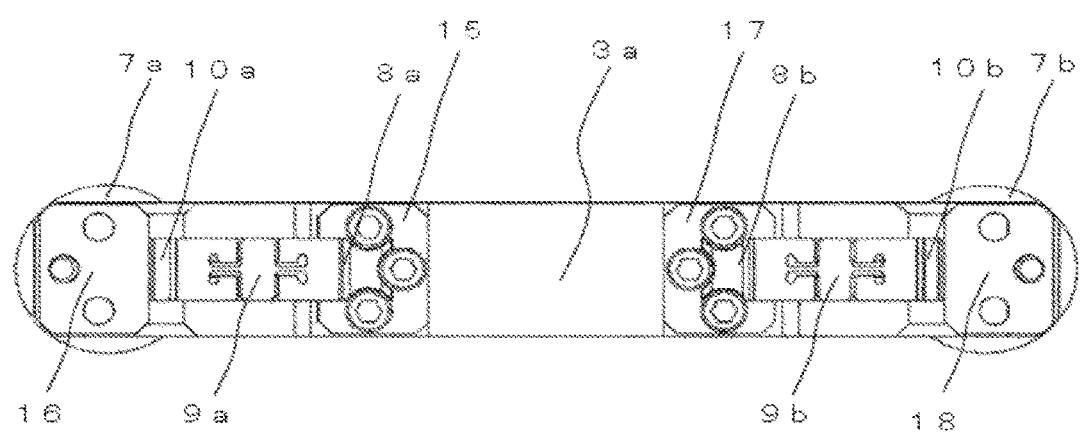
FIG. 11 is a plan view illustrating the mirror support of the first embodiment of the present invention.
Figure 11:
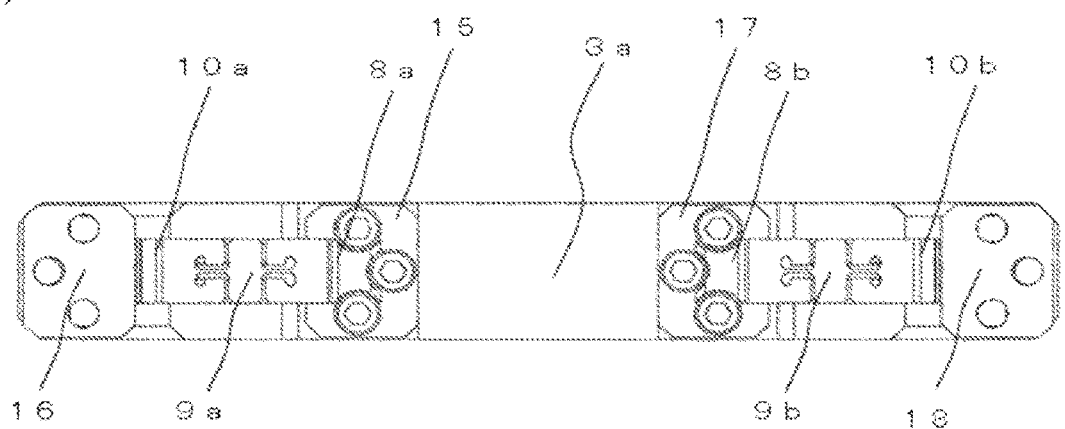
Figure 12:
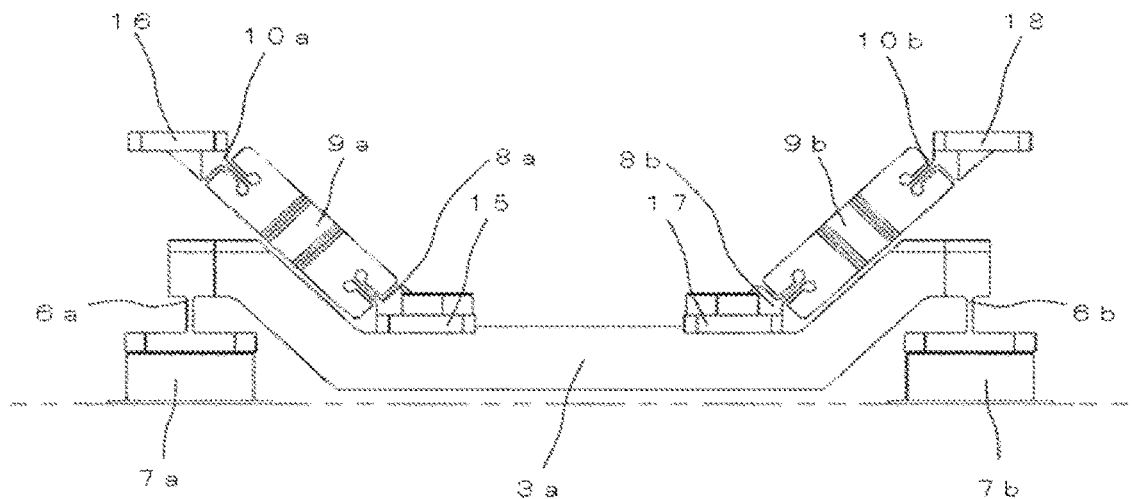
FIG. 12 is a front view illustrating the mirror support of the first embodiment of the present invention.
Figure 12:
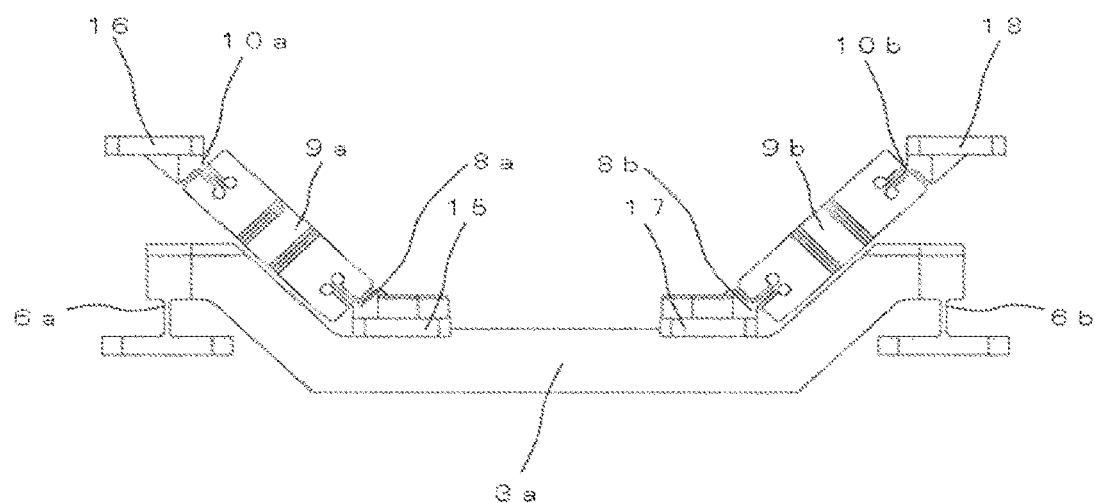
Figure 13:
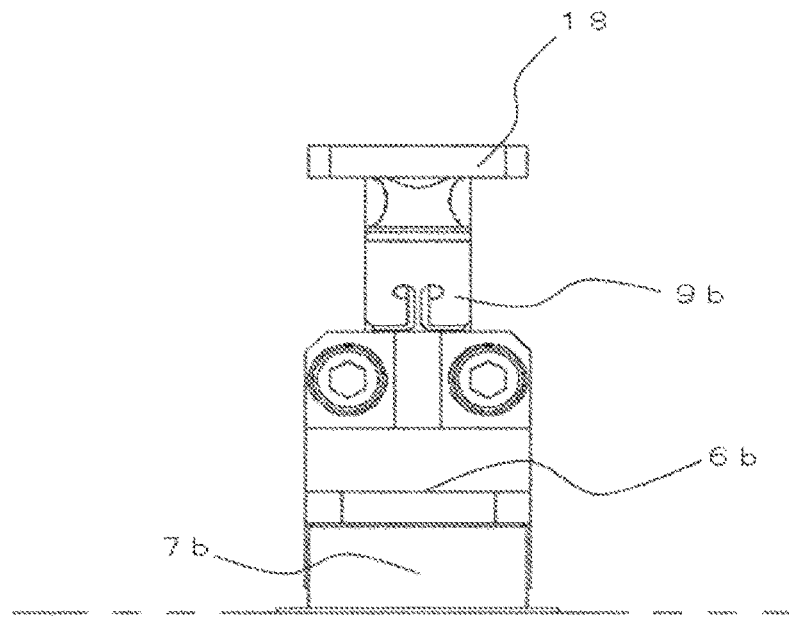
FIG. 13 is a side view illustrating the mirror support of the first embodiment of the present invention.
Figure 13:
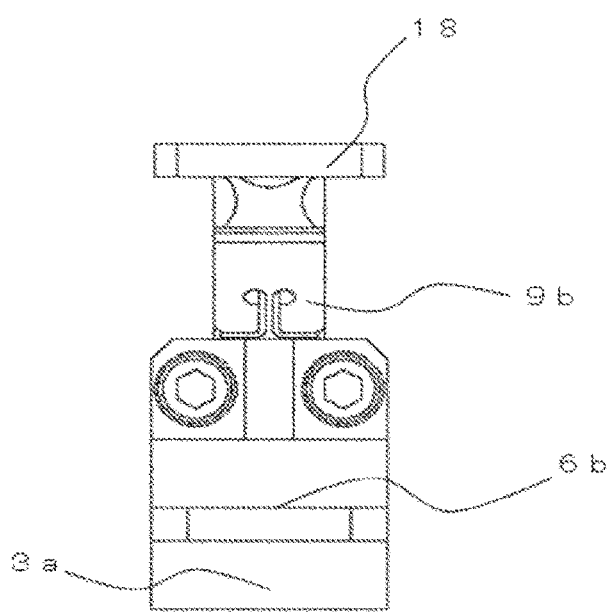
Figure 14:
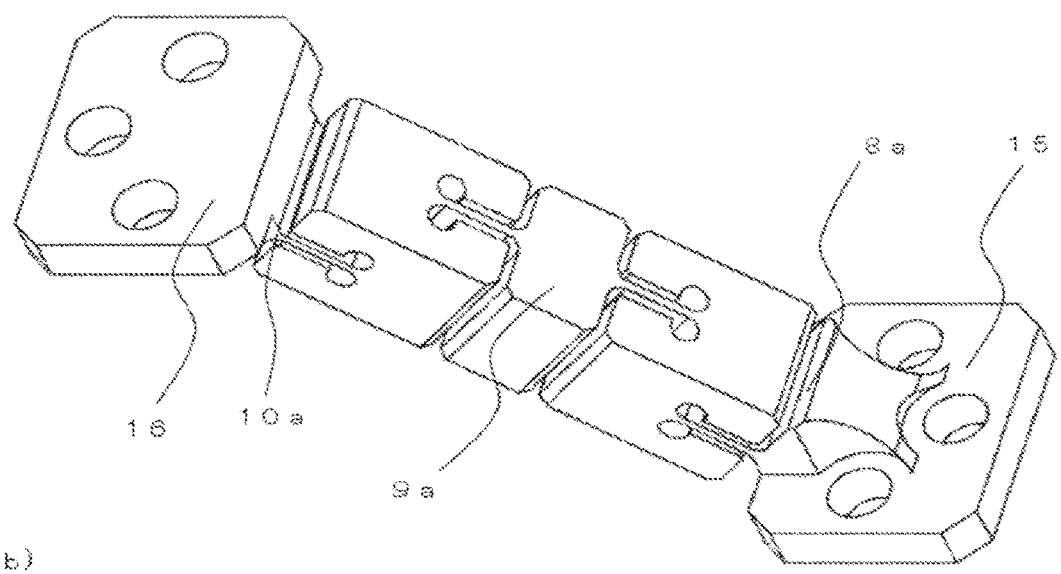
FIG. 14 is a configuration diagram illustrating the mirror support (rod) of the first embodiment of the present invention.
Figure 14:
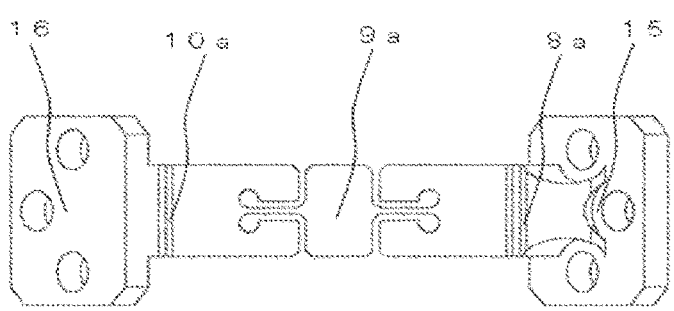
Figure 14:
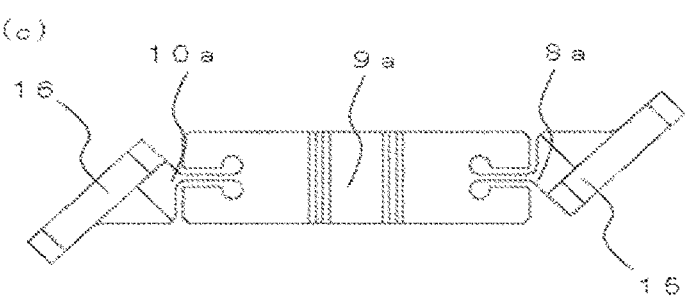
Figure 14:
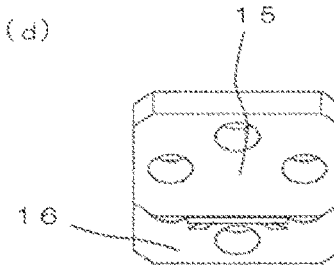
Figure 15:
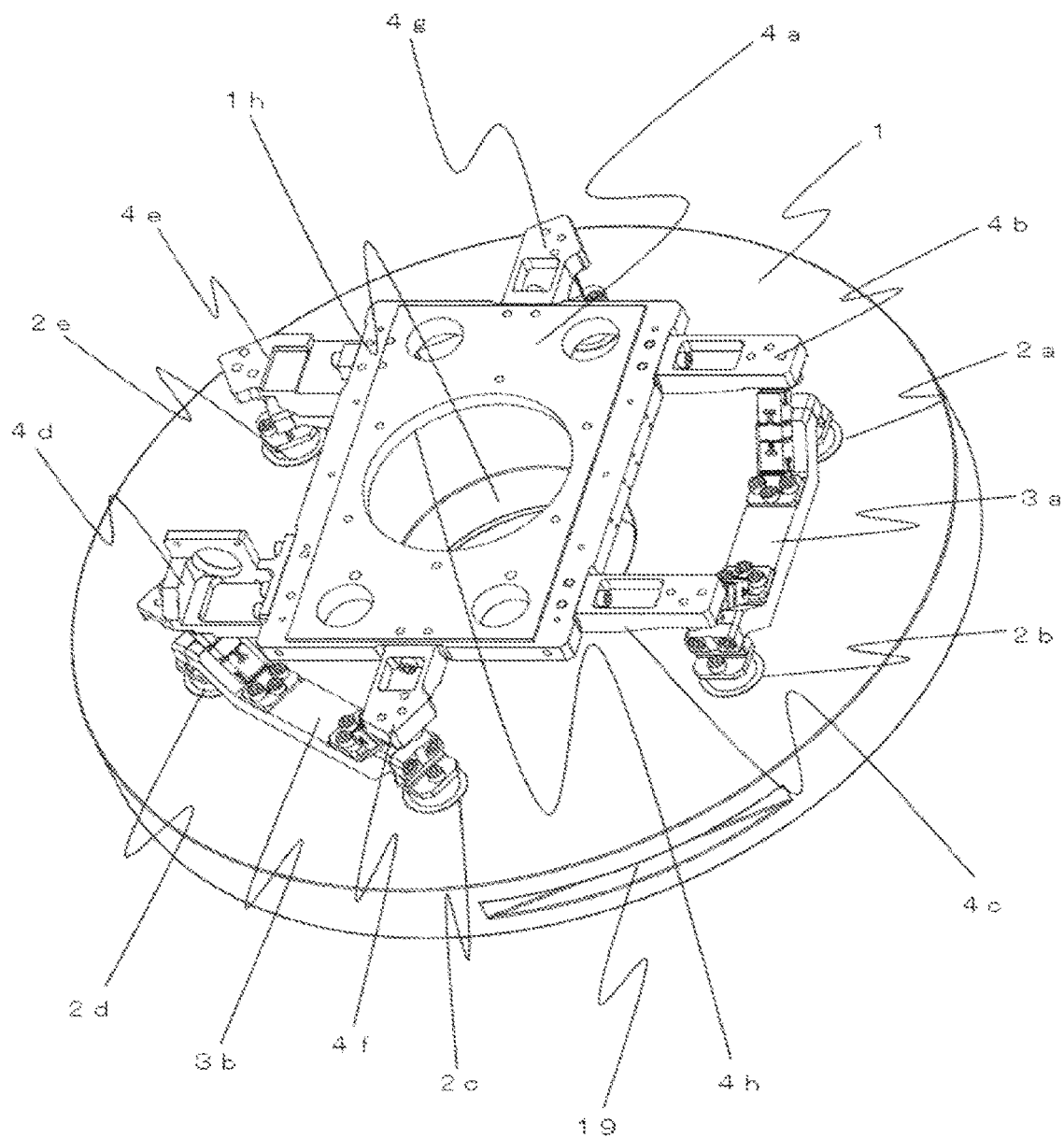
FIG. 15 is a perspective view illustrating a mirror support mechanism according to a second embodiment of the present invention (a perspective view seen from a back surface side of a mirror).

FIG. 5(*a*) is a view illustrating a relationship between six mirror fixing units of the mirror support mechanism (mirror support) and three constraint points. FIG. 5(*b*) is a view illustrating the relationship between the six mirror fixing units of the mirror support mechanism (mirror support) and the three constraint points, and illustrates the case where a leaf spring unit is used for the mirror fixing unit. FIG. 7(*a*) is a view illustrating a whiffletree structure that is a structure of a comparative example with respect to the whiffletree structure of the mirror support mechanism (mirror support). In particular, FIG. 7(*a*) illustrates the whiffletree structure in which a bearing is used to release rotation. FIG. 7(*b*) is a view illustrating a whiffletree structure of the mirror support mechanism (mirror support). FIG. 8(*a*) is a view illustrating a power point of the mirror support mechanism (mirror support) when the mirror surface is vertically oriented. FIG. 8(*b*) is a view illustrating the power point of the mirror support mechanism (mirror support) when the mirror surface is horizontally oriented. FIG. 9(*a*) is a view illustrating the mirror support mechanism (mirror support) that suppresses rigid movement of the mirror when the mirror surface is vertically oriented. FIG. 9(*b*) is a view illustrating the mirror support mechanism (mirror support) that suppresses the rigid movement of the mirror when the mirror surface is horizontally oriented.

In FIGS. 1 to 9, a mirror 1 is the secondary mirror of the optical telescope or the radio telescope. A mirror fixing unit 2 (a mirror fixing unit 2*a*, a mirror fixing unit 2*b*, a mirror fixing unit 2*c*, a mirror fixing unit 2*d*, a mirror fixing unit 2*e*, a mirror fixing unit 2*f*) is located on the back surface (the rear surface, the opposite surface to the mirror surface) of mirror 1, and fixes at least six locations at equal intervals on an identical circumference (concentric circle) of mirror 1. That is, mirror fixing unit 2 fixes mirror 1 at 6×n locations (n is a positive integer). The first embodiment exemplifies the case where mirror fixing unit 2 is mirror fixing unit 2a, mirror fixing unit 2b, mirror fixing unit 2c, mirror fixing unit 2d, mirror fixing unit 2e, mirror fixing unit 2f. Mirror fixing unit 2 may have the whiffletree structure including an arm 3 (an arm 3a, an arm 3b, an arm 3c) separated from mirror 1 (the back surface of mirror 1). Arm 3 is formed at 3×n locations (n is a positive integer). That is, one arm 3 is provided for two mirror fixing units 2. Structure examples of mirror fixing unit 2 and arm 3 will be described later. A support structure 4 supports mirror fixing unit 2.

In FIGS. 1 to 9, support structure 4 is an interface (for example, a triaxial drive stage) of the mirror support mechanism (mirror support) connected to the telescope side. Support structure 4 includes a rectangular main body 4a, a first connector 4b, a first connector 4c, a first connector 4d, a first connector 4e, a second connector 4f, and a second connector 4g. First connector 4b, first connector 4c, first connector 4d, and first connector 4e are formed on long sides of two ends in a long side direction of main body 4a. Second connector 4f and second connector 4g are formed on two short sides of main body 4a. Second connector 4f and second connector 4g are formed at the center of the two short sides of main body 4a. Main body 4a is a plate-shaped member. As illustrated in the figures, another opening other than an opening 4h may be formed in support structure 4 (main body 4a, first connector 4b, first connector 4c, first connector 4d, first connector 4e, second connector 4f, second connector 4g) for the purpose of weight reduction or the like as long as rigidity can be maintained to secure strength.

In the mirror support mechanism of the first embodiment, the first connector (first connector 4b, first connector 4c, first connector 4d, first connector 4e) and the second connector (second connector 4f, second connector 4g) support mirror fixing unit 2. In particular, first connector 4b supports mirror fixing unit 2a. First connector 4c supports mirror fixing unit 2b. Second connector 4f supports mirror fixing unit 2c. First connector 4d supports mirror fixing unit 2d. First connector 4e supports mirror fixing unit 2e. Second connector 4g supports mirror fixing unit 2f. Since support structure 4 has the configuration in which downsizing is easily performed while the rigidity is maintained, a possibility of being capable of applying support structure 4 is enhanced even when the interface with support structure 4 on the telescope side is complicated.

At least one of the first connector (first connector 4b, first connector 4c, first connector 4d, first connector 4e) and the second connector (second connector 4f, second connector 4g) has a shape protruding from main body 4a. In the figures, all the first connector (first connector 4b, first connector 4c, first connector 4d, first connector 4e) and the second connector (second connector 4f, second connector 4g) protrude from main body 4a. Each of support structure 4 (main body 4) and mirror 1 includes an opening at the center, and preferably support structure 4 (main body 4) and mirror 1 communicate with each other at the same virtual axis. Mirror fixing unit 2 is disposed so as to avoid an opening 1h of mirror 1. Opening 1h of mirror 1 and opening 4h of support structure 4 (main body 4) are an opening orthogonal to the optical axis direction (Z-axis direction). That is, opening 1h and opening 4h are an opening in which a member passing through the opening can be disposed. The member will be described in a mirror support mechanism according to a third embodiment.

In the mirror support mechanism of the first embodiment, mirror fixing units 2 at the six locations equally support a load of mirror 1, thereby suppressing degradation of mirror surface accuracy of mirror 1. For this reason, the degradation of performance of mirror 1 is suppressed even when mirror 1 is located at any position within a driving range of the telescope by driving (scanning) the telescope on which mirror 1 (secondary mirror) is mounted. With reference to FIGS. 5 to 9, this will be described in detail. The details will be described through the description of the mirror support that is installed between mirror 1 and support structure 4a and in the optical axis direction (Z-direction) of mirror 1 to support mirror 1. The mirror support includes arm 3, and is formed at 3×n locations (n is a positive integer) similarly to arm 3. That is, one mirror support is provided for two mirror fixing units 2.

In FIGS. 5 to 9, a constraint point 5 (a constraint point 5a, a constraint point 5b, a constraint point 5c) is a constraint point that constrains the movement of mirror 1, and is indicated by a dotted circle. Constraint point 5 is formed at 3×n locations (n is a positive integer) similarly to the mirror support. That is, one constraint point 5 is provided for two mirror fixing units 2. Constraint point 5 (constraint point 5a, constraint point 5b, constraint point 5c) is disposed on a virtual plane 14 (to be described later) passing through a center of gravity of mirror 1.

In FIGS. 5 to 9, a first pad 7a (a first pad 7c, a first pad 7e) is fixed to mirror 1. A second pad 7b (second pad 7d, second pad 7f) is fixed to mirror 1 at a position different from that of first pad 7a (first pad 7c, first pad 7e). Arm 3a (arm 3b, arm 3c) is laid between first pad 7a and second pad 7a (between first pad 7a and second pad 7d, between first pad 7e and second pad 7f) while separated from mirror 1. A first-pad elastic body 6a (a first-pad elastic body 6c, a first-pad elastic body 6e) is formed between arm 3a (arm 3b, arm 3c) and first pad 7a (first pad 7c, first pad 7e). A second-pad elastic body 6b (a second-pad elastic body 6d, a second-pad elastic body 6f) is formed between arm 3a (arm 3b, arm 3c) and second pad 7b (second pad 7d, second pad 7f).

The positions where first pad 7a, second pad 7b, first pad 7c, second pad 7d, first pad 7e, and second pad 7f are fixed to mirror 1 are matched with the positions where mirror fixing unit 2a, mirror fixing unit 2b, mirror fixing unit 2c, mirror fixing unit 2d, mirror fixing unit 2e, and mirror fixing unit 2f are fixed to mirror 1, respectively. That is, it can be said that first pad 7a, second pad 7b, first pad 7c, second pad 7d, first pad 7e, and second pad 7f correspond to parts of mirror fixing unit 2a, mirror fixing unit 2b, mirror fixing unit 2c, mirror fixing unit 2d, mirror fixing unit 2e, and mirror fixing unit 2f.

In the mirror support of the first embodiment, first pad 7a (first pad 7c, first pad 7e) and second pad 7b (second pad 7d, second pad 7f) are disposed at the positions where first pad 7a and second pad 7b are deformed in a longitudinal direction of arm 3 (arm 3a, arm 3b, arm 3c). Preferably first pad 7a (first pad 7c, first pad 7e) and second pad 7b (second pad 7d, second pad 7f) are formed of, for example, a plate-shaped elastic member and a rigid member, respectively, and the plate-shaped elastic member is disposed at the position where the plate-shaped elastic member is deformed in the longitudinal direction of arm 3 (arm 3a, arm 3b, arm 3c). The longitudinal direction of arm 3 (arm 3a, arm 3b, arm 3c) corresponds to the direction orthogonal to the radial direction (R-axis direction) of mirror 1 at constraint point 5 (constraint point 5a, constraint point 5b, constraint point 5c).

In FIGS. 5 to 9, a leaf spring unit 8a and a leaf spring unit 8b (leaf spring unit 8c, a leaf spring unit 8d, leaf spring unit 8e, leaf spring unit 8f) are formed of a plate-shaped elastic member and a rigid member. Here, the rigid member is a connection member with arm 3. The plate-shaped elastic member is a leaf spring. The plate-shaped elastic member is disposed at the position where the plate-shaped elastic member is deformed in the longitudinal direction of arm 3 (arm 3a, arm 3b, arm 3c). The plate-shaped elastic member (leaf spring) is connected to block members (to be described later) of a leaf spring unit 9a and a leaf spring unit 9b (a leaf spring unit 9c, a leaf spring unit 9d, a leaf spring unit 9e, a leaf spring unit 9f).

In FIGS. 5 to 9, leaf spring unit 9a and leaf spring unit 9b (leaf spring unit 9c, leaf spring unit 9d, leaf spring unit 9e, leaf spring unit 9f) are formed of a plate-shaped elastic member and a rigid member. Here, the rigid member is three block members. The plate-shaped elastic member is two leaf springs. The plate-shaped elastic member is disposed at a position where the plate-shaped elastic member is deformed in a direction (short direction) orthogonal to the longitudinal direction of arm 3 (arm 3a, arm 3b, arm 3c). The short direction of arm 3 (arm 3a, arm 3b, arm 3c) corresponds to the radial direction (R-axis direction) of mirror 1 at constraint point 5 (constraint point 5a, constraint point 5b, constraint point 5c). Leaf spring unit 9a and leaf spring unit 9b (leaf spring unit 9c, leaf spring unit 9d, leaf spring unit 9e, leaf spring unit 9f) are disposed in the following order from leaf spring unit 8a and leaf spring unit 8b (leaf spring unit 8c, leaf spring unit 8d, leaf spring unit 8e, leaf spring unit 8f) toward a leaf spring unit 10a and a leaf spring unit 10b (a leaf spring unit 10c, a leaf spring unit 10d, a leaf spring unit 10e, a leaf spring unit 10f). That is, the block member, the leaf spring, the block member, the leaf spring, and the block member that are connected to the leaf springs of leaf spring unit 9a and leaf spring unit 9b (leaf spring unit 9c, leaf spring unit 9d, leaf spring unit 9e, leaf spring unit 9f) are sequentially disposed. The last block member is connected to the leaf springs (to be described later) of leaf spring unit 10a and leaf spring unit 10b (leaf spring unit 10c, leaf spring unit 10d, leaf spring unit 10e, leaf spring unit 10f).

Leaf spring unit 10a and leaf spring unit 10b (leaf spring unit 10c, leaf spring unit 10d, leaf spring unit 10e, leaf spring unit 10f) are formed of a plate-shaped elastic member and a rigid member. At this point, the rigid member is a connection member with support structure 4. The plate-shaped elastic member is a leaf spring. The plate-shaped elastic member is disposed at the position where the plate-shaped elastic member is deformed in the longitudinal direction of arm 3 (arm 3a, arm 3b, arm 3c). The plate-shaped elastic member (leaf spring) is connected to the block members of leaf spring unit 9a and leaf spring unit 9b (leaf spring unit 9c, leaf spring unit 9d, leaf spring unit 9e, leaf spring unit 9f).

A difference in coefficient of thermal expansion between mirror 1 and support structure 4 generated in the radial direction of mirror 1 (strictly, the radial direction (R-axis direction) of mirror 1 at constraint point 5 (constraint point 5a, constraint point 5b, constraint point 5c)) can be absorbed by leaf spring unit 9a, leaf spring unit 9b, leaf spring unit 9c, leaf spring unit 9d, leaf spring unit 9e, and leaf spring unit 9f. For this reason, a material having a higher coefficient of thermal expansion than that of mirror 1 can be used as the material for support structure 4.

In FIGS. 5 to 9, each of a first rod 11a and a second rod 11b (a first rod 11c, a second rod 11d and a first rod 11e, a second rod 11f) includes leaf spring unit 8a, leaf spring unit 8b (leaf spring unit 8c, leaf spring unit 8d, leaf spring unit 8e, leaf spring unit 8f), leaf spring unit 9a, leaf spring unit 9b (leaf spring unit 9c, leaf spring unit 9d, leaf spring unit 9e, leaf spring unit 9f), leaf spring unit 10a, and leaf spring unit 10b (leaf spring unit 10c, leaf spring unit 10d, leaf spring unit 10e, leaf spring unit 10f). The functions of these leaf spring units are elastic rotation and slight elastic displacement. Each combination of first rod 11a and second rod 11b, first rod 11c and second rod 11d, and first rod 11e and second rod 11f acts as a bipod 11ab, a bipod 11cd, and a bipod 11ef.

One end of first rod 11a (first rod 11c, first rod 11e) is connected to arm 3a (arm 3b, arm 3c) at the position closer to the side of first pad 7a (first pad 7c, first pad 7e) with respect to second pad 7b (second pad 7d, second pad 7f), and the other end that stretches from the connected position while being inclined toward the side of first pad 7a (first pad 7c, first pad 7e) is connected to support structure 4.

As described above, the direction in which arm 3 (arm 3a, arm 3b, arm 3c) stretches (extends) is referred to as the longitudinal direction of arm 3 (arm 3a, arm 3b, arm 3c). Similarly, the direction orthogonal to the longitudinal direction of arm 3 (arm 3a, arm 3b, arm 3c) is referred to as the short direction (longitudinal orthogonal direction) of arm 3 (arm 3a, arm 3b, arm 3c). The longitudinal direction and the short direction (longitudinal orthogonal direction) are a direction parallel to a plane defined by the X-axis and the Y-axis (a plane defined by the R-axis and the C-axis). That is, the same definition is applied even when a part of arm 3 (arm 3a, arm 3b, arm 3c) is partially bent. A first-rod elastic body that is an elastic body constituting first rod 11a (first rod 11c, first rod 11e) is formed of the pluralities of plate-shaped elastic members and rigid members as described above, and at least one plate-shaped elastic member is disposed at the position where the plate-shaped elastic member is deformed in the short direction of arm 3 (arm 3a, arm 3b, arm 3c). At least one plate-shaped elastic member is disposed at the position where the plate-shaped elastic member is deformed in the longitudinal direction of arm 3 (arm 3a, arm 3b, arm 3c).

One end of second rod 11b (second rod 11d, second rod 11f) is connected to the position closer to the side of second pad 7b (second pad 7d, second pad 7f) with respect to first pad 7a (first pad 7c, first pad 7e) of arm 3 (arm 3a, arm 3b, arm 3c), and the other end that stretches while being inclined from the connected position toward the side of second pad 7b (second pad 7d, second pad 7f) is connected to support structure 4. A second-rod elastic body that is an elastic body constituting second rod 11b (second rod 11d, second rod 11f) is formed of the pluralities of plate-shaped elastic members and rigid members as described above, and at least one plate-shaped elastic member is disposed at the position where the plate-shaped elastic member is deformed in the radial direction of mirror 1. At least one plate-shaped elastic member is disposed at the position where the plate-shaped elastic member is deformed in the circumferential direction of mirror 1.

The other end of the first rod and the first pad are opposite to each other in the optical axis direction, and the other end of second rod 11b (second rod 11d, second rod 11f) and second pad 7b (second pad 7d, second pad 7f) are opposite to each other in the optical axis direction (Z-axis direction). That is, at least one of first-pad elastic body 6a (first-pad elastic body 6c, first-pad elastic body 6e), second-pad elastic body 6b (second-pad elastic body 6d, second-pad elastic body 6f), the first-rod elastic body, and the second-rod elastic body is formed of the plate-shaped elastic member and the rigid member. Thus, first-pad elastic body 6a (first-pad elastic body 6c, first-pad elastic body 6e) and second-pad elastic body 6b (second-pad elastic body 6d, second-pad elastic body 6f) are also referred to as the leaf spring unit, and may be used as leaf spring unit 6a, leaf spring unit 6b, leaf spring unit 6c, leaf spring unit 6d, leaf spring unit 6e, and leaf spring unit 6f. Each of leaf spring unit 6a, leaf spring unit 6b, leaf spring unit 6c, leaf spring unit 6d, leaf spring unit 6e, and leaf spring unit 6f is made of the rigid member (block member) and the plate-shaped elastic member (leaf spring). The functions of these leaf spring units are the elastic rotation and the slight elastic displacement similarly to other leaf spring units used in first rod 11a and second rod 11b (first rod 11c, second rod 11d, first rod 11e, second rod 11f). The plate-shaped elastic members of leaf spring units 6a to 6f are disposed at the positions where the plate-shaped elastic members are deformed in the longitudinal direction of arm 3.

In FIGS. 6 to 9, a first virtual line 12 is a virtual line obtained by stretching first rod 11a (first rod 11c, first rod 11e) in the direction of mirror 1, and is indicated by an alternate long and short dash line. A second virtual line 13 is a virtual line obtained by stretching second rod 11b (second rod 11d, second rod 11f) in the direction of mirror 1, and is indicated by an alternate long and short dash line. Inclination angles of first rod 11a (first rod 11c, first rod 11e) and second rod 11b (second rod 11d, second rod 11f) are an angle at which a point where first virtual line 12 and second virtual line 13 intersect with each other (an intersection 14a, an intersection point 14a) exists on virtual plane 14 where the center of gravity of mirror 1 is located. Virtual plane 14 is illustrated by an alternate long and short dash line. Virtual plane 14 is a plane that is formed of the X-axis and the Y-axis (a plane formed of the R-axis and the C-axis) and includes the center of gravity of mirror 1. That is, virtual plane 14 is a plane orthogonal to the Z-axis. Intersection 14a corresponds to constraint point 5. It can be said that intersection 14a (intersection point 14a) is the intersection point of bipod 11ab, bipod 11cd, and bipod 11ef.

In FIGS. 5 to 9, the illustrations of first-pad elastic body 6c, second-pad elastic body 6d, first-pad elastic body 6e, and second-pad elastic body 6f are omitted because first-pad elastic body 6c, second-pad elastic body 6d, first-pad elastic body 6e, and second-pad elastic body 6f have the same structure as first-pad elastic body 6a and second-pad elastic body 6b. Similarly, the illustrations of first pad 7c, second pad 7d, first pad 7e, and second pad 7f are omitted because first pad 7c, second pad 7d, first pad 7e, and second pad 7f have the same structure as first pad 7a and second pad 7b. Similarly, the illustrations of leaf spring unit 8c, leaf spring unit 8d, leaf spring unit 8e, and leaf spring unit 8f are omitted because leaf spring unit 8c, leaf spring unit 8d, leaf spring unit 8e, and leaf spring unit 8f have the same structure as leaf spring unit 8a and leaf spring unit 8b. Similarly, the illustrations of leaf spring unit 9c, leaf spring unit 9d, leaf spring unit 9e, and leaf spring unit 9f are omitted because leaf spring unit 9c, leaf spring unit 9d, leaf spring unit 9e, and leaf spring unit 9f have the same structure as leaf spring unit 9a and leaf spring unit 9b. Similarly, the illustrations of leaf spring unit 10c, leaf spring unit 10d, leaf spring unit 10e, and leaf spring unit 10f are omitted because leaf spring unit 10c, leaf spring unit 10d, leaf spring unit 10e, and leaf spring unit 10f have the same structure as leaf spring unit 10a and leaf spring unit 10b. Similarly, the illustrations of first rod 11c, second rod 11d, first rod 11e, and second rod 11f are omitted because first rod 11c, second rod 11d, first rod 11e, and second rod 11f have the same structure as first rod 11a and second rod 11b.

The relationship between the mirror support of the first embodiment and the mirror support mechanism of the first embodiment is as follows. The mirror support mechanism of the first embodiment is a mirror support mechanism including at least three mirror supports of the first embodiment (at least three means 3×n locations (n is a positive integer)). The mirror support mechanism of the first embodiment includes mirror 1 and support structure 4 (main body 4a). In mirror 1, a distance between first pad 7a (first pad 7c, first pad 7e) and second pad 7f (second pad 7b, second pad 7d) of the mirror supports adjacent to each other and a distance between first pad 7a (first pad 7c, first pad 7e) and second pad 7b (second pad 7d, second pad 7f) of the same mirror support are equal to each other, and first pad 7a (first pad 7c, first pad 7e) and second pad 7b (second pad 7d, second pad 7f) are fixed onto an identical circumference 1c (a concentric circle 1c) of mirror 1.

The description of the relationship between the mirror support of the first embodiment and the mirror support mechanism of the first embodiment will be continued. With regard to first connector 4b, first connector 4c, first connector 4d, and first connector 4e, a first one of the first connectors (first connector 4b) and a second one of the first connectors (first connector 4c) that are formed on one long side (the long side of main body 4a) are connected to first rod 11a and second rod 11b connected to arm 3a, respectively.

With regard to first connector 4b, first connector 4c, first connector 4d, and first connector 4e, a third one of the first connectors (first connector 4e) formed on the other long side (the long side of main body 4a) is connected to first rod 11e different from first rod 11a to which the first one of the first connectors (first connector 4b) is connected, and a fourth one of the first connectors (first connectors 4d) formed on the other long side (the long side of main body 4a) is connected to second rod 11d different from second rod 11b to which the second one of the first connectors (first connectors 4c) is connected.

With regard to second connector 4f and second connector 4g, a first one of the second connectors (second connector 4g) formed on one short side (the short side of main body 4a) is connected to second rod 11f connected to arm 3c as first rod 11e to which the third one of the first connectors (first connector 4e) is connected, and a second one of the second connectors (second connector 4f) formed on the other short side is connected to first rod 11c connected to arm 3b as second rod 11d to which the fourth one of the first connectors (first connector 4d) is connected.

For the purpose of simplification, the reference numerals of first rod 11a, second rod 11b, first rod 11c, second rod 11d, first rod 11e, and second rod 11f are not illustrated in FIGS. 1 to 4. In FIGS. 1 to 4, first rod 11a is disposed while inclined above mirror fixing unit 2a. Second rod 11b is disposed while inclined above mirror fixing unit 2b. First rod 11c is disposed while inclined above mirror fixing unit 2c. Second rod 11d is disposed while inclined above mirror fixing unit 2d. First rod 11e is disposed while inclined above mirror fixing unit 2e. Second rod 11f is disposed while inclined above mirror fixing unit 2f.

That is, in FIGS. 1 to 4, mirror fixing unit 2a and first connector 4b are opposed to each other in the optical axis direction (z-axis direction) with first rod 11a interposed therebetween. Mirror fixing unit 2b and first connector 4c are opposed to each other in the optical axis direction (z-axis direction) with second rod 11b interposed therebetween. Mirror fixing unit 2c and second connector 4f are opposed to each other in the optical axis direction (z-axis direction) with first rod 11c interposed therebetween. Mirror fixing unit 2d and first connector 4d are opposed to each other in the optical axis direction (z-axis direction) with second rod 11d interposed therebetween. Mirror fixing unit 2e and first connector 4e are opposed to each other in the optical axis direction (z-axis direction) with first rod 11e interposed therebetween. Mirror fixing unit 2f and second connector 4g are opposed to each other in the optical axis direction (z-axis direction) with second rod 11f interposed therebetween.

FIG. 5 illustrates the state in which the distance between first pad 7a (first pad 7c, first pad 7e) and second pad 7f (second pad 7b, second pad 7d) of the mirror supports adjacent to each other and the distance between first pad 7a (first pad 7c, first pad 7e) and second pad 7b (second pad 7d, second pad 7f) of the same mirror support are equal to each other. In particular, FIG. 5 illustrates the state in which the distance between mirror fixing unit 2a (mirror fixing unit 2c, mirror fixing unit 2e) and mirror fixing unit 2f (mirror fixing unit 2b, mirror fixing unit 2d) that are adjacent to each other and the distance between mirror fixing unit 2a (mirror fixing unit 2c, mirror fixing unit 2e) and mirror fixing unit 2b (mirror fixing unit 2d, mirror fixing unit 2f) that are adjacent to each other are equal to each other. That is, all mirror fixing unit 2a, mirror fixing unit 2b, mirror fixing unit 2c, mirror fixing unit 2d, mirror fixing unit 2e, and mirror fixing unit 2f are arranged at equal intervals on identical circumference 1c of mirror 1. As described above, mirror 1 includes opening 1h in the center, and first pad 7a (first pad 7c, first pad 7e) and second pad 7b (second pad 7d, second pad 7f) are disposed so as to avoid opening 1h.

Figure 6:
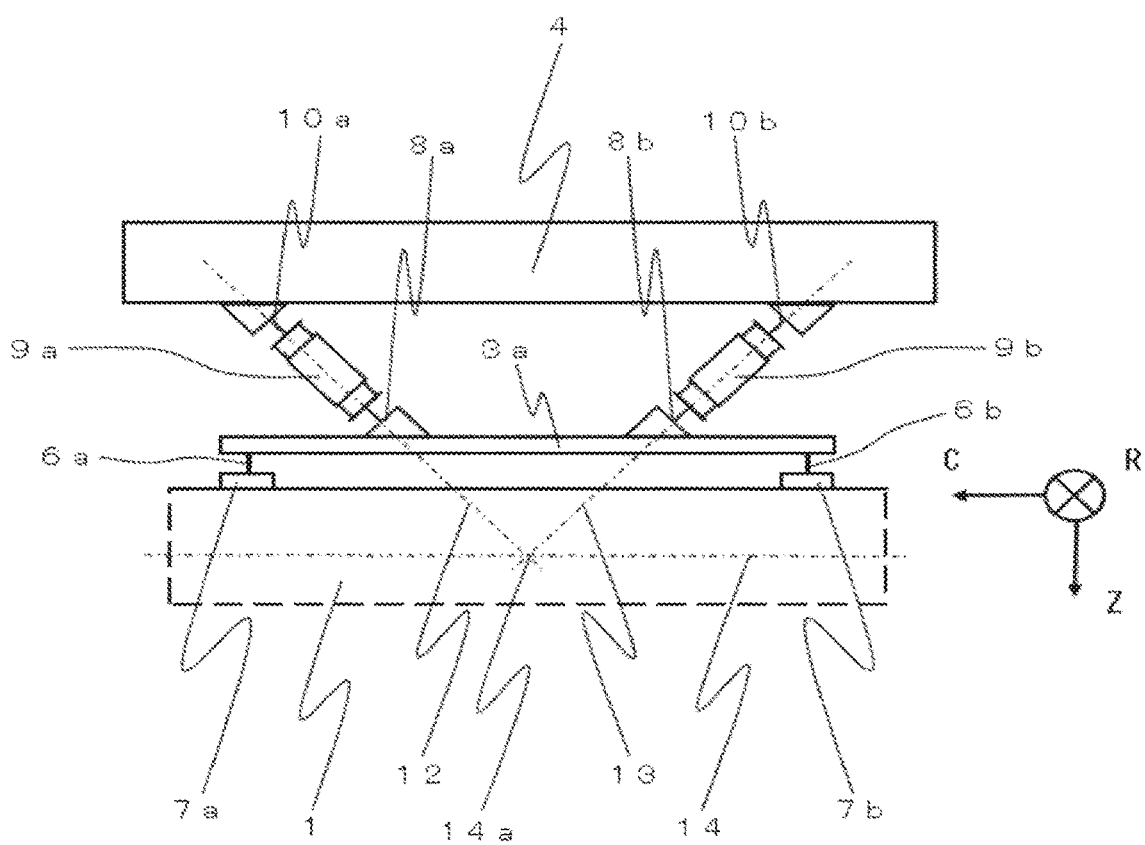
FIG. 6 is a schematic front view illustrating the mirror support mechanism of the first embodiment of the present invention.

The suppression of the rigid movement of mirror 1 using the mirror support (mirror support mechanism) of the first embodiment will be described. As illustrated in FIGS. 5 and 6, six mirror fixing units 2 (the first pad, the second pad) are arranged on identical circumference 1c on the back surface (the rear surface, the opposite surface to the mirror surface) of mirror 1, and bonded to mirror 1, or fastened and fixed to mirror 1 using a fastening member such as a screw. First-pad elastic body 6a, second-pad elastic body 6b, first-pad elastic body 6c, second-pad elastic body 6d, first-pad elastic body 6e, and second-pad elastic body 6f are fastened to mirror fixing unit 2 (the first pad, the second pad) using the fastening members such as screws. The mirror support (mirror support mechanism) of the first embodiment can sufficiently support only by the back surface (the rear surface, the opposite surface to the mirror surface) of mirror 1.

Each of first-pad elastic body 6a and second-pad elastic body 6b is fastened to arm 3a using the fastening member such as the screw. Each of first-pad elastic body 6c and second-pad elastic body 6d is fastened to arm 3b using the fastening member such as the screw. Each of first-pad elastic body 6e and second-pad elastic body 6f is fastened to arm 3c using the fastening member such as the screw. One end of bipod 11ab is fastened to different locations of arm 3a using the fastening member such as the screw. The other end of bipod 11ab is fastened to first connector 4b and first connector 4c using the fastening member such as the screw. One end of bipod 11cd is fastened to different locations of arm 3b using the fastening member such as the screw. The other end of bipod 11cd is fastened to second connector 4f and first connector 4d using the fastening member such as the screw. One end of bipod 11 of is fastened to different locations of arm 3c using the fastening member such as the screw. The other end of bipod 11 of is fastened to first connector 4e and second connector 4g using the fastening member such as the screw.

In the mirror support (mirror support mechanism) of the first embodiment, arm 3 (arm 3a, arm 3b, arm 3c) is supported by an elastic body such as a leaf spring to form the whiffletree structure. With this whiffletree structure, the load of mirror 1 is equally supported by first pad 7a, second pad 7b, first pad 7c, second pad 7d, first pad 7e, and second pad 7f (mirror fixing unit 2a, mirror fixing unit 2b, mirror fixing unit 2c, mirror fixing unit 2d, mirror fixing unit 2e, mirror fixing unit 2f). First pad 7a, second pad 7b, first pad 7c, second pad 7d, first pad 7e, second pad 7f (mirror fixing unit 2a, mirror fixing unit 2b, mirror fixing unit 2c, mirror fixing unit 2d, mirror fixing unit 2e, mirror fixing unit 2f), and arm 3 are disposed so as to be symmetric in the vertical axis direction (Y-axis direction) of mirror 1. This is because when the telescope on which mirror 1 (mirror support mechanism) is installed is oriented in the horizontal direction, force supported by mirror fixing units 2 arrayed on into each three on the left and right of the Y-axis is equally divided with respect to the Y-axis. Arm 3a extends in parallel with the altitude axis direction (X-axis direction) of mirror 1. Thus, when mirror fixing unit 2a (first pad 7a) and mirror fixing unit 2b (second pad 7b) are connected to each other by a straight line (an alternate long and short dash line illustrated in FIG. 5(a)), the straight line becomes parallel to the X-axis.

As illustrated in FIG. 7(b), in the mirror support (mirror support mechanism) of the first embodiment, the rotation of arm 3a about the center thereof becomes free like a seesaw board by leaf spring unit 8a and leaf spring unit 8b in first rod 11a including leaf spring unit 8a, leaf spring unit 9a, and leaf spring unit 10a and second rod 11b including leaf spring unit 8b, leaf spring unit 9b, and leaf spring unit 10b. Further, arm 3a that operates like the seesaw board acts such that the loads of mirror 1 applied to first-pad elastic body 6a (leaf spring unit 6a) and second-pad elastic body 6b (leaf spring unit 6b) are balanced with each other. Arm 3b and arm 3c have the same configuration, and perform the operation to balance the loads of mirror 1. Mirror 1 is supported by the equal force using arm 3 that performs the operation. Thus, it can be said that mirror fixing unit 2 has the whiffletree structure. As a more ideal structure, it is considered that a circular or trifurcated flat plate is used as support structure 4. In a mirror support (mirror support mechanism) in which bipod 11ab, bipod 11cd, and bipod 11ef are used, circular or six-forked flat plate support structure 4 is considered as a more ideal structure. That is, when the number of bipod 11ab, bipod 11cd, bipod 11ef, and a support column 11p (to be described below) is n (integer), support structure 4 is an n-forked flat plate. It is ideal that flat plates such as the circular flat plate, the n-forked flat plate, support structure 4 (rectangular main body 4a, first connector 4b, first connector 4c, first connector 4d, first connector 4e, second connector 4f, second connector 4g) are supported from the telescope structure near the center. For example, the telescope structure is an interface of the mirror support mechanism (mirror support) in which the circular flat plate, the n-forked flat plate, and support structure 4 are connected to the telescope side.

The mirror support (mirror support mechanism) of the first embodiment operates in the same manner as the whiffletree structure in which the rotation is released using a bearing in FIG. 7(a). In FIG. 7(a), one end of support column 11p supports arm 3 with the bearing interposed therebetween, and the other end is supported by support structure 4. However, when the bearing or support column 11p is used to release the rotation, the structure becomes larger and more complicated, and rattle of the bearing (that means the rattle due a manufacturing errors of the bearing, a deformation amount of mirror 1 increases due to the rattle to degrade the mirror surface accuracy) is generated, and a frequency of bearing maintenance is high. On the other hand, since when the plate-shaped elastic member (leaf spring) is used as in the mirror support (mirror support mechanism) of the first embodiment, there is no unstable component such as the bearing, the rattle is hardly generated, and the same deformation mode of mirror 1 is obtained. The same deformation mode means that the deformation can be predicted by a mathematical formula or matrix data, so that an instrumental error of the optical performance of mirror 1 can be corrected or the optical performance of mirror 1 can be adjusted by software and the like.

However, although there is a problem, the mirror support mechanism of the first embodiment does not exclude the combination of the whiffletree structure in which the rotation is released using the bearing and support structure 4 (the main body, any one of three connectors). Opening 4h may be formed in support structure 4. Similarly, opening 1h may be formed in mirror 1. The details of opening 4h and opening 1h will be described in a third embodiment. As an example in which the combination is not excluded, three support columns 11p that support arm 3 using the bearings (because of three arms 3) are formed, and may be supported by first connector 4b and first connector 4c adjacent to each other, second connector 4f and first connector 4d adjacent to each other, and first connector 4e and second connector 4g adjacent to each other one by one. Three support columns 11p may be supported one by one by first connector 4b, second connector 4f, and first connector 4e. Three support columns 11p may be supported one by one by first connector 4c, first connector 4d, and second connector 4g. When the entire structure of the mirror support mechanism of the first embodiment is rotated so as to be symmetric with respect to the Y-axis, the degradation of the mirror surface accuracy of mirror 1 can be prevented even when mirror 1 is oriented toward a horizontal line as illustrated in FIG. 8(b) (FIG. 9(b)).

In the above description, the telescope in which mirror 1 (mirror support mechanism) is installed while the mirror support (mirror support mechanism) of the first embodiment is supported by arm 3 with the equal force is oriented in a zenithal direction (FIG. 8(a)). However, in the mirror support (mirror support mechanism) of the first embodiment, the rigid movement of mirror 1 can be suppressed even when the telescope on which mirror 1 (mirror support mechanism) is installed is oriented in the horizontal direction (FIG. 8(b)). The center of gravity of mirror 1 is denoted by a symbol in FIGS. 8(a), 8(b), 9(a), and 9(b).

As illustrated in FIG. 9, bipod 11ab (in the figure, second rod 11b is hidden behind first rod 11a, but exists), bipod 11cd (in the figure, bipod 11cd is hidden behind bipod 11ef, but exists), and bipod 11 of offset respective intersection points 14a from the rear surface of mirror 1 to dispose intersection points 14a at different positions in virtual plane 14 passing through the center of gravity of mirror 1. Consequently, the three whiffletree structures function to constrain mirror 1 at the three constraint points, which allows the suppression of the rigid movement (schematically indicated by an arc-shaped arrow in FIG. 9) of entire mirror 1. When intersection points 14a of bipod 11ab, bipod 11cd, and bipod 11 of deviate from virtual plane 14, mirror 1 is supported in such a manner that the moment load is applied to mirror 1. When mirror 1 is supported while a moment load is applied to mirror 1, rigid movement of entire mirror 1 becomes large to degrade the mirror surface accuracy of mirror 1. This is particularly conspicuous when the telescope on which mirror 1 (mirror support mechanism) is installed is oriented in the horizontal direction.

With reference to FIGS. 10 to 14, the structure of the mirror support of the first embodiment will be described below. For the purpose of the simple description, a peripheral structure of bipod 11ab will be described as a representative, but bipod 11ed and bipod 11ef have the same configuration. Identical circumference 1c on which first pad 7a, second pad 7b, first pad 7c, second pad 7d, first pad 7e, and second pad 7f (mirror fixing unit 2a, mirror fixing unit 2b, mirror fixing unit 2c, mirror fixing unit 2d, mirror fixing unit 2e, mirror fixing unit 2f) are formed supports mirror 1 with the equal force when mirror 1 is oriented downward to select the position where an influence of the mirror surface accuracy of mirror 1 can be reduced. Additionally, in identical circumference 1c, the position where mirror 1 can be supported by a bilaterally symmetric structure with respect to the vertical axis (Y-axis) is selected when mirror 1 is oriented toward the horizontal line. When opening 1h is formed in mirror 1, identical circumference 1c is formed so as to avoid opening 1h.

FIGS. 10(a), 11(a), 12(a), and 13(a) illustrate the mirror support in the state in which first pad 7a and second pad 7b are formed. An alternate long and two short dashes line illustrated in FIGS. 12(a) and 13(a) indicates the back surface of mirror 1. It can be seen from the positional relationship between the alternate long and two short dashes line and arm 3a, arm 3a is separated from mirror 1 even when the mirror support is fixed to mirror 1. FIGS. 10(b), 11(b), 12(b), and 13(b) illustrate the mirror support in the state in which first pad 7a and second pad 7b are not formed. For this reason, arm 3a is visible. FIG. 10 is a perspective view of the mirror support. FIG. 11 is a plan view of the mirror support (a bottom view is omitted because it is clear from other figures). FIG. 12 is a front view of the mirror support (a rear view is omitted because it is the same as the front view). FIG. 13 is a side view of the mirror support (the right side view and the left side view are omitted because they are the same, and only the right side view is illustrated).

FIG. 14(a) is a perspective view of first rod 11a, and FIG. 14(b) is a plan view of first rod 11a (the bottom view is omitted because the shape is clear from other figures). FIG. 14(c) is a front view of first rod 11a (the rear view is omitted because the shape is clear from other figures). FIG. 14(d) is a right side view of first rod 11a (the left side view is omitted because the shape is clear from other figures). First rod 11a has the same structure as second rod 11b, first rod 11e, second rod 11d, first rod 11e, and second rod 11f.

In FIGS. 10 to 14, a flange 15 is a flange through which a fastening member connecting first rod 11a and arm 3a is passed. A flange 16 is a flange through which a fastening member connecting first rod 11a and support structure 4 is passed. A flange 17 is a flange through which a fastening member connecting second rod 11b and arm 3a is passed. A flange 18 is a flange through which a fastening member connecting second rod 11b and support structure 4 is passed.

As illustrated in FIGS. 10 to 14, arm 3a is bent from a portion (flange 15) connected to first rod 11a, and stretched along first rod 11 a between the portion (flange 15) connected to first rod 11 and first pad 7a. The stretching continues to a vicinity of flange 16. Similarly, arm 3a is bent from a portion (flange 17) connected to second rod 11b, and stretched along second rod 11b between the portion (flange 17) connected to second rod 11b and second pad 7b. The stretching continues to the vicinity of flange 18.

Additionally, as illustrated in FIGS. 10 to 14, arm 3a is bent from the portion (flange 15) connected to first rod 11a, stretched along first rod 11a between the portion (flange 15) connected to first rod 11a and first pad 7a, further bent on the side of first pad 7a, and connected to first pad 7a with first-pad elastic body 6a interposed therebetween. First pad 7a and flange 16 are opposite to each other. In first-pad elastic body 6a (leaf spring unit 6a), the plate-shaped elastic member (leaf spring) is integrally formed between the rigid member (block member) and the rigid member (block member). First-pad elastic body 6c (leaf spring unit 6c) and first-pad elastic body 6e (leaf spring unit 6e) have the same structure. Arm 3a is bent from the portion (flange 17) connected to second rod 11b, stretched along second rod 11b between the portion (flange 17) connected to second rod 11b and second pad 7b, further bent on the side of second pad 7b, and connected to second pad 7b with second-pad elastic body 7b interposed therebetween. Second pad 7b and flange 18 are opposite to each other. In second-pad elastic body 6b (leaf spring unit 6a), the plate-shaped elastic member (leaf spring) is integrally formed between the rigid member (block member) and the rigid member (block member). Second-pad elastic body 6d (leaf spring unit 6d) and second-pad elastic body 6f (leaf spring unit 6f) have the same structure.

Further, as illustrated in FIGS. 10 to 14, in arm 3a, a portion stretching along first rod 11a between the portion (flange 15) connected to first rod 11a and first pad 7a is parallel to first rod 11a. In arm 3a, a portion stretching along second rod 11b between the portion (flange 17) connected to second rod 11b and second pad 7b is parallel to second rod 11b.

In other words, it can be said that arm 3a is bent from the portion connected to first pad 7a in the direction of mirror 1, stretched along first rod 11a, and stretched in parallel to mirror 1 from the portion (flange 15) connected to first rod 11a toward the location connected to second rod 11b. Similarly, it can be said that arm 3a is bent in the direction of mirror 1 from the portion connected to second pad 7b, stretched along second rod 11b, and stretched in parallel to mirror 1 from the portion (flange 17) connected to second rod 11b toward the location connected to first rod 11a.

That is, as described above, since the longitudinal direction and the short direction (longitudinal orthogonal direction) are parallel to the plane defined by the X-axis and the Y-axis (the plane defined by the R-axis and the C-axis), the following can be said about arm 3 (arm 3a, arm 3b, arm 3c). A center of arm 3 (arm 3a, arm 3b, arm 3c) is parallel to the longitudinal direction and the short direction (longitudinal orthogonal direction), and it can be said that the end of arm 3 (arm 3a, arm 3b, arm 3c) is bent onto the opposite side to mirror 1. The bent point is parallel to the longitudinal direction and the short direction (longitudinal orthogonal direction).

As illustrated in FIGS. 10 to 14 (in particular, FIG. 14), first rod 11a includes flange 15, leaf spring unit 8a, leaf spring unit 9a, leaf spring unit 10a, and flange 16. Leaf spring unit 8a is formed of the rigid member (connection member) and the plate-shaped elastic member (leaf spring), and the connection member of leaf spring unit 8a and flange 15 are integrally formed. Leaf spring unit 10a is formed of the rigid member (connection member) and the plate-shaped elastic member (leaf spring), and the connection member of leaf spring unit 10a and flange 16 are integrally formed. Leaf spring unit 9a is formed of the three rigid members (block members) and the plate-shaped elastic members (leaf springs) each of which is located between adjacent rigid members. That is, there are two plate-shaped elastic members (leaf springs). One rigid member (block member) except for the middle one of leaf spring units 9a is connected to the plate-shaped elastic member (leaf spring) of leaf spring unit 8a. The other rigid member (block member) except for the middle one of leaf spring units 9a is connected to the plate-shaped elastic member (leaf spring) of leaf spring unit 10a.

Similarly, as illustrated in FIGS. 10 to 14 (in particular, FIG. 14), second rod 11b includes flange 17, leaf spring unit 8b, leaf spring unit 9b, leaf spring unit 10b, and flange 18. Leaf spring unit 8b is formed of the rigid member (connection member) and the plate-shaped elastic member (leaf spring), and the connection member of leaf spring unit 8b and flange 17 are integrally formed. Leaf spring unit 10b is formed of the rigid member (connection member) and the plate-shaped elastic member (leaf spring), and the connection member of leaf spring unit 10b and flange 18 are integrally formed. Leaf spring unit 9b is formed of the three rigid members (block members) and the plate-shaped elastic members (leaf springs) each of which is located between adjacent rigid members. That is, there are two plate-shaped elastic members (leaf springs). One rigid member (block member) except for the middle one of leaf spring units 9b is connected to the plate-shaped elastic member (leaf spring) of leaf spring unit 8b. The other rigid member (block member) except for the middle one of leaf spring units 9b is connected to the plate-shaped elastic member (leaf spring) of leaf spring unit 10b.

In the mirror support of the first embodiment, arm 3 (arm 3a, arm 3b, arm 3c) has the above configuration, so that the height in the optical axis direction (Z-axis direction) of mirror 1 can be easily suppressed in supporting mirror 1.

Second Embodiment

A second embodiment is different from the first embodiment in the configuration of mirror 1 of the mirror support mechanism. The mirror support of the first embodiment and a mirror support of the second embodiment have the same configuration. In FIGS. 15 to 18, a plurality of depressions 19 are formed on a side surface (circumferential direction) of mirror 1.

Figure 16:
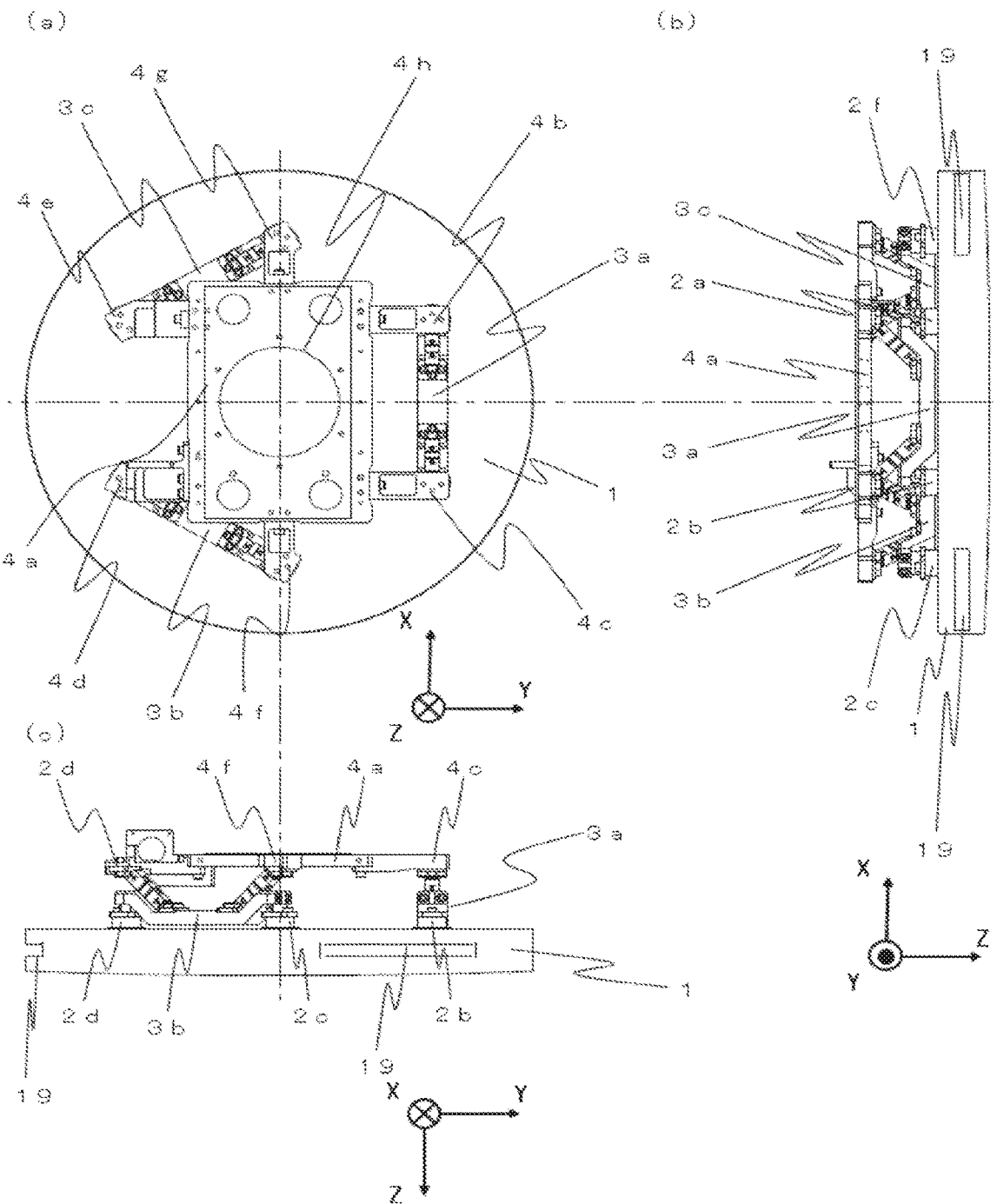
FIG. 16 is a plan view, a front view, and a side view illustrating the mirror support mechanism of the second embodiment of the present invention.
Figure 17:
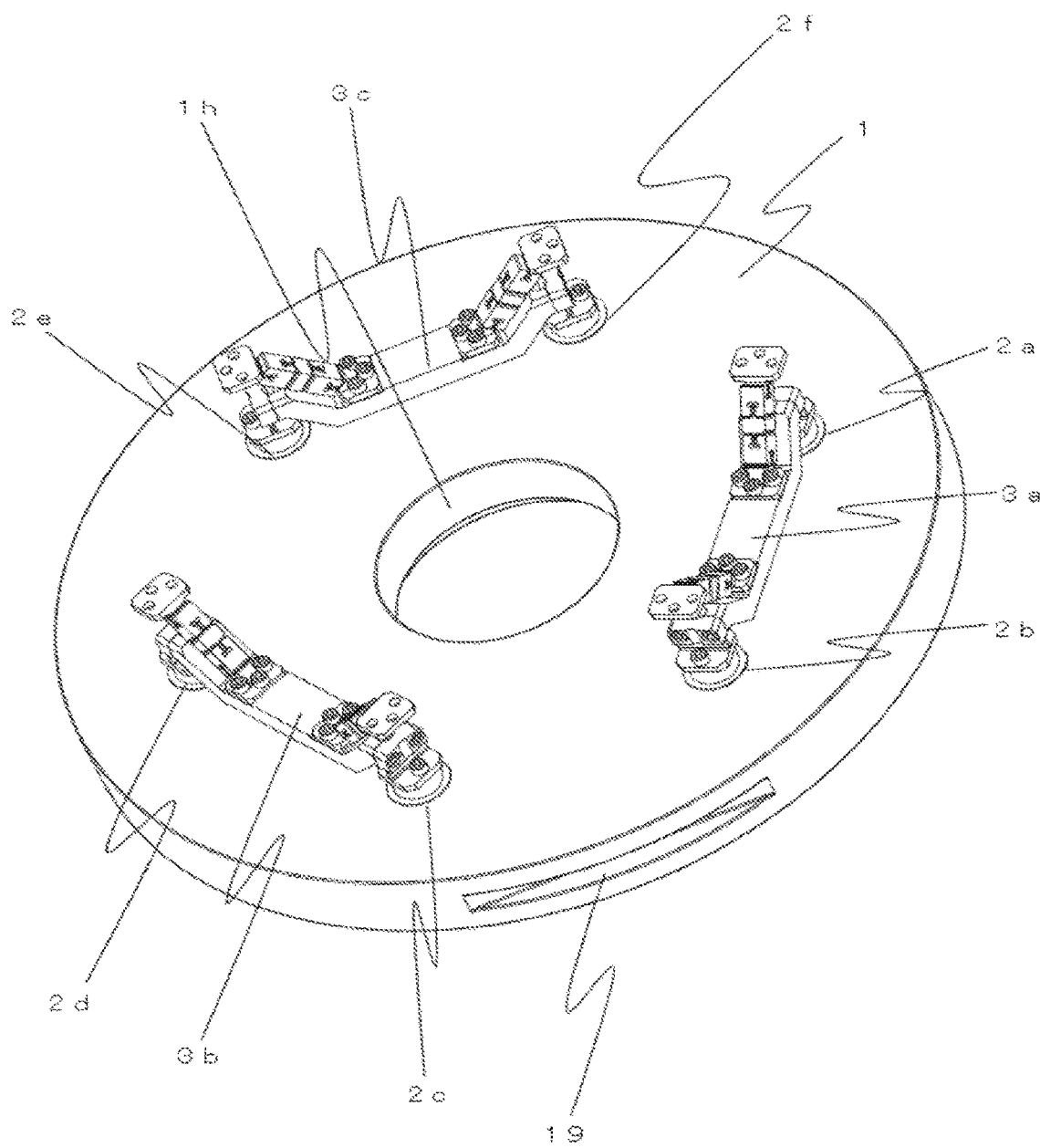
FIG. 17 is a perspective view illustrating the mirror support mechanism of the second embodiment of the present invention (a perspective view as seen from the back surface side of the mirror) (before a support structure is attached).

FIG. 16(a) is a plan view of the mirror support mechanism. Since the mirror support mechanism has a main configuration on a back surface of a mirror (a rear surface, a surface opposite to a mirror surface), the back surface of the mirror is set to a plan view. That is, a bottom view of the mirror support mechanism becomes the mirror surface of the mirror. FIG. 16(b) is a front view of the mirror support mechanism. A rear view of the mirror support mechanism is clear from FIGS. 1 and 2. FIG. 16(c) is a side view of the mirror support mechanism. The right side view and the left side view of the mirror support mechanism are similar to each other, and the difference between the right side view and the left side view is clear from FIGS. 15 and 16.

Figure 18:
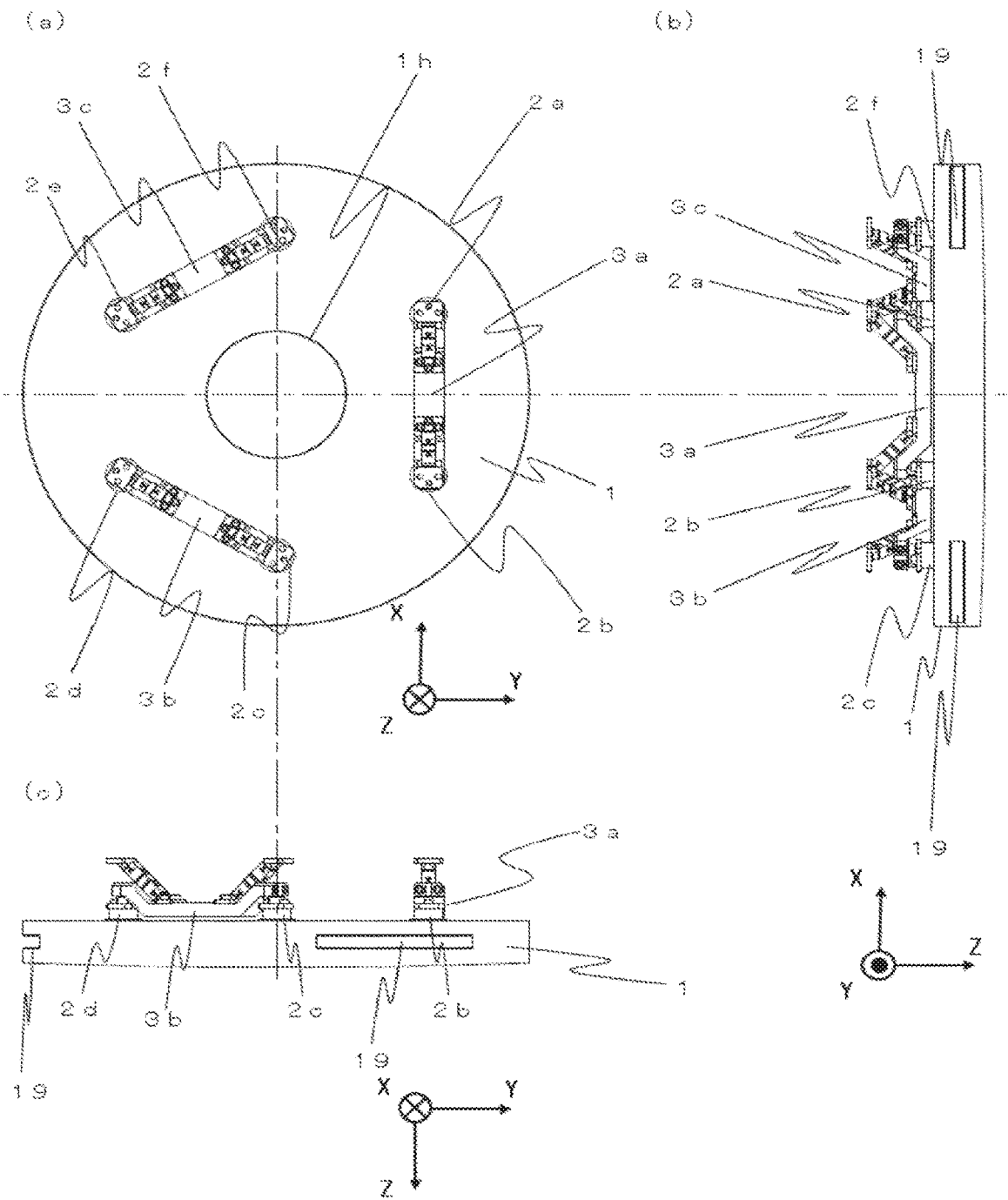
FIG. 18 is a plan view, a front view, and a side view illustrating the mirror support mechanism of the second embodiment of the present invention (before the support structure is attached).

The relationship among FIGS. 18(a), 18(b), and 18(c) is the same as that among FIGS. 16(a), 16(b), and 16(c). That is, FIG. 18(a) is a plan view of the mirror support mechanism. As in FIG. 2, the bottom view of the mirror support mechanism becomes the mirror surface of the mirror. FIG. 18(b) is a front view of the mirror support mechanism. The rear view of the mirror support mechanism is clear from FIGS. 17 and 18. FIG. 4(c) is a side view of the mirror support mechanism. The right side view and the left side view of the mirror support mechanism are similar, and the difference between the right side view and the left side view is clear from FIGS. 3 and 4.

About the rest, since FIGS. 15 to 18 have the same configuration as that in FIGS. 1 to 4 used to describe the mirror support and the mirror support mechanism of the first embodiment except for depression 19, the detailed description will be omitted. Three depressions 19 are formed at three locations in FIGS. 15 to 18, but are not limited to this configuration.

In the mirror support mechanism of the second embodiment, depression 19 is formed in mirror 1, so that a removal jig can be hooked in depression 19 when mirror 1 is removed from the mirror support during maintenance of the telescope on which mirror 1 (mirror support mechanism) is installed. Thus, the maintenance of the telescope can be easily performed. Depression 19 is radially recessed from the side surface of mirror 1. A shape of depression 19 may be formed according to a shape of the removal jig of mirror 1. Thus, the shape of depression 19 is not limited to the illustrated one. As described above, depressions 19 are formed at three locations in the figures, but the invention is not limited to this configuration.

Third Embodiment

Figure 19:
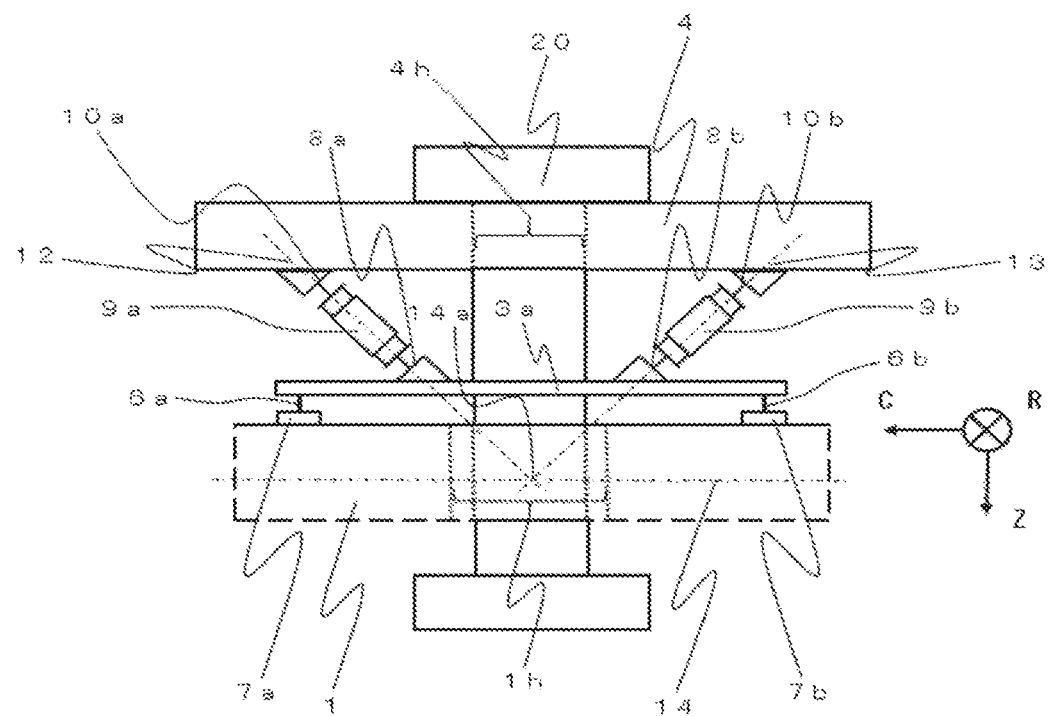
FIG. 19 is a schematic front view illustrating a mirror support mechanism according to a third embodiment of the present invention.

A third embodiment includes a fall prevention mechanism (a fall prevention unit 20) of mirror 1 that is applicable to the mirror support mechanisms of the first and second embodiments. The fall prevention mechanism is strictly the fall stop mechanism of mirror 1, but is referred to as a fall prevention mechanism or fall prevention unit 20 for convenience. That is, fall prevention unit 20 acts as a fall stop when mirror 1 falls from at least one of first pad 7a, second pad 7b, first pad 7c, second pad 7d, first pad 7e, and second pad 7f. The mirror support and the mirror support mechanism of the third embodiment and the mirror support and the mirror support mechanism of the first and second embodiments have the same configuration regarding the mirror support mechanism. In FIG. 19, a base end of fall prevention unit 20 is fixed to support structure 4.

As in the first and second embodiments, in the mirror support mechanism of the third embodiment, each of support structure 4 (main body 4) and mirror 1 has an opening in the center thereof, and preferably support structure 4 (main body 4) and mirror 1 communicate with each other in the same virtual axis. Mirror fixing unit 2 is disposed so as to avoid an opening 1h of mirror 1. Opening 1h and opening 4h are an opening in which a member passing therethrough can be disposed. The member is fall prevention unit 20. It is considered that fall prevention unit 20 has an uppercase I-shape, a shape obtained by inverting an uppercase T-shape, or a convex shape. FIG. 19 is a schematic front view of the mirror support mechanism. In FIG. 19, opening 1h, opening 4h, and a part of fall prevention unit 20 are indicated by a dotted line. Fall prevention unit 20 may be a columnar one. Fall prevention unit 20 is not limited to a columnar one as long as fall prevention unit 20 can function as the fall stop mechanism of mirror 1, and pass through opening 1h, but does not contact with the inner wall of opening 1h.

As illustrated in FIG. 19, the base end of fall prevention unit 20 is fixed to opening 4h of support structure 4, and a front end of fall prevention unit 20 projects onto the mirror surface side of mirror 1 through opening 1h of mirror 1. A diameter of the front end (fall prevention unit 20) projecting on the mirror surface side is larger than a diameter of opening 1h of mirror 1. There is a gap between fall prevention unit 20 and mirror 1. In the mirror support mechanism of the third embodiment, fall prevention unit 20 does not normally contact with mirror 1 due to the gap. For this reason, the force is not applied to mirror 1 from fall prevention unit 20. However, when the fixing to mirror 1 by at least one of first pad 7a, second pad 7b, first pad 7c, second pad 7d, first pad 7e, and second pad 7f is released, mirror 1 contacts with fall prevention unit 20 (mainly, the front end of fall prevention unit 20), which allows mirror 1 to be prevented from falling. This is particularly effective when mirror 1 is oriented downward.

In particular, as illustrated in FIG. 19, it can be said that fall prevention unit 20 is formed of the base end, an insertion unit, and the front end. As described above, in the base end and the front end of fall prevention unit 20, fall prevention unit 20 has two insertion units inserted into opening 4h and opening 1h and two exposed insertion units. In the insertion unit of fall prevention unit 20, the portion inserted into opening 1h is separated from the inner wall of opening 1h. The side of mirror 1 at the front end of fall prevention unit 20 is separated from the mirror surface of mirror 1.

As in the mirror support and the mirror support mechanism of the first and second embodiments, the mirror support and the mirror support mechanism of the third embodiment may be used for other purposes such as weight reduction while opening 1h and opening 4h are kept open. That is, support structure 4 (main body 4) and mirror 1 include the opening in the center thereof, and optically communicate with each other. In the mirror support mechanism of the third embodiment, a recess 4h may be formed without penetrating opening 4h. Recess 4h fixes the base end of fall prevention unit 20. Further, mirror fixing unit 2 is disposed so as to avoid opening 1h of mirror 1, so that fall prevention unit 20 and the mirror support (first and second embodiments) other than support structure 4 (opening 4h and recess 4h) can be easily prevented from contacting with each other.

The mirror support mechanism of the third embodiment is also performed as a mirror removal method of the third embodiment. The mirror removal method of the third embodiment will be described below. An object from which mirror 1 is removed is set to the mirror support mechanism of the first to third embodiments including fall prevention unit 20. A fall prevention unit removal step of removing fall prevention unit 20 from support structure 4 (opening 4h, recess 4h) is performed. Subsequently, a mirror fixing step of fixing mirror 1 with a removal jig is performed. In the mirror fixing step, in the mirror support mechanism of the second embodiment, mirror 1 is fixed by hooking the removal jig in depression 19. When depression 19 does not exist, the side direction (lateral direction) of mirror 1 may be sandwiched using the removal jig. The order of the fall prevention unit removal step and the mirror fixing step may be performed in reverse order, or concurrently performed. A pad removal step of removing first pad 7a, second pad 7b, first pad 7c, second pad 7d, first pad 7e, and second pad 7f that fix mirror 1 from mirror 1 while mirror 1 is fixed using the removal jig is performed. A mirror removal step of pulling out mirror 1 in the axial direction using the removal jig to remove mirror 1 from the mirror support mechanism is performed after the pad removal step. A mirror attaching method of the third embodiment proceeds the steps in the reverse order of the mirror removal method of the third embodiment. That is, a mirror attaching step (reverse to the mirror removal step), a pad attaching step (reverse to the pad removal step), a mirror fixing releasing step (reverse to the mirror fixing step), and a fall prevention unit attaching step (reverse to the fall prevention unit removal step) are sequentially performed. The mirror fixing releasing step and the fall prevention unit attaching step may be performed in reverse order, or concurrently performed.

As described above, in the mirror support and the mirror support mechanism of the first to third embodiments, when the telescope on which the mirror support mechanism (mirror 1) is installed is oriented toward the zenith, mirror 1 is supported with the equal force by the mirror support and the mirror support mechanism, and the degradation of the mirror surface accuracy of mirror 1 can be reduced. In the mirror support and the mirror support mechanism of the first and second embodiments, when the telescope is oriented toward the horizontal line, mirror 1 is supported by the bilaterally symmetric structure of the mirror support and the mirror support mechanism with respect to the vertical axis (Y-axis), and the degradation of the mirror surface accuracy of mirror 1 can be reduced. In the mirror removal method of the third embodiment, mirror 1 can be removed from the mirror support mechanism of the first to third embodiments. In the mirror attaching method of the third embodiment, mirror 1 can be attached from the mirror support mechanism of the first to third embodiments.

The features described in the above embodiments (examples included in the embodiments) may be appropriately combined within a range where technical contradiction is not generated.

It should be considered that the disclosed embodiments are an example in all respects and not restrictive. The scope of the present invention is defined by not the description above, but the claims, and it is intended that all modifications within the meaning and scope of the claims and their equivalents are included in the present invention.

REFERENCE SIGNS LIST

1: mirror (secondary mirror), 1*c*: identical circumference (concentric circle), 1*h*: opening, 2, 2*a*, 2*b*, 2*c*, 2*d*, 2*e*, 2*f*: mirror fixing unit, 3, 3*a*, 3*b*, 3*c*: arm, 4: support structure, 4*a*: main body, 4*b*, 4*c*, 4*d*, 4*e*: first connector, 4*f*, 4*g*: second connector, 4*h*: opening (recess), 5, 5*a*, 5*b*, 5*c*: constraint point, 6*a*, 6*c*, 6*e*: first-pad elastic body (leaf spring unit), 6*b*, 6*d*, 6*f*: second-pad elastic body (leaf spring unit), 7*a*, 7*c*, 7*e*: first pad, 7*b*, 7*d*, 7*f*: second pad, 8*a*, 8*b*, 8*c*, 8*d*, 8*e*, 8*f*, 9*a*, 9*b*, 9*c*, 9*d*, 9*e*, 9*f*, 10*a*, 10*b*, 10*c*, 10*d*, 10*e*, 10*f*: leaf spring unit, 11*a*, 11*c*, 11*e*: first rod, 11*ab*, 11*cd*, 11*ef*: bipod, 11*b*, 11*d*, 11*f*: second rod, 11*p*: support column, 12: first virtual line, 13: second virtual line, 14: virtual plane, 14*a*: intersection (intersection point), 15, 16, 17, 18: flange, 19: depression, 20: fall prevention unit

The invention claimed is:

1. A mirror support installed between a mirror and a support structure and in an optical axis direction of the mirror to support the mirror, the mirror support comprising:
   a first pad fixed to the mirror;
   a second pad fixed to the mirror at a position different from the first pad;
   an arm laid between the first pad and the second pad while separated from the mirror;
   a first-pad elastic body formed between the arm and the first pad;
   a second-pad elastic body formed between the arm and the second pad;
   a first rod in which one end is connected to the arm at a position closer to a side of the first pad with respect to the second pad while the other end stretched and inclined onto the side of the first pad from the position connected is connected to the support structure;
   a first-rod elastic body that is an elastic body constituting the first rod;
   a second rod in which one end is connected to the arm at a position closer to a side of the second pad with respect to the first pad while the other end stretched and inclined onto the side of the second pad from the position connected is connected to the support structure; and
   a second-rod elastic body that is an elastic body constituting the second rod,
   wherein inclination angles of the first rod and the second rod are an angle at which a point where a first virtual line obtained by stretching the first rod in a direction of the mirror and a second virtual line obtained by stretching the second rod in the direction of the mirror intersect with each other exists on a virtual plane that is orthogonal to the optical axis of the mirror and in which a center of gravity of the mirror is located.

2. The mirror support according to claim 1, wherein the arm is bent from a portion connected to the first rod, stretched along the first rod between the portion connected to the first rod and the first pad, bent from a portion connected to the second rod, and stretched along the second rod between the portion connected to the second rod and the second pad.

3. The mirror support according to claim 2, wherein the arm is stretched along the first rod between the portion connected to the first rod and the first pad, and further bent on the side of the first pad, connected to the first pad with the first-pad elastic body interposed therebetween, stretched along the second rod between the portion connected to the second rod and the second pad, further bent on the side of the second pad, and connected to the second pad with the second-pad elastic body interposed therebetween.

4. The mirror support according to claim 3, wherein in the arm, a portion stretched along the first rod between the portion connected to the first rod and the first pad is parallel to the first rod, and a portion stretched along the second rod between the portion connected to the second rod and the second pad is parallel to the second rod.

5. The mirror support according to claim 2, wherein in the arm, a portion stretched along the first rod between the portion connected to the first rod and the first pad is parallel to the first rod, and a portion stretched along the second rod between the portion connected to the second rod and the second pad is parallel to the second rod.

6. The mirror support according to claim 1, wherein the other end of the first rod and the first pad are opposite to each other in the optical axis direction, and the other end of the second rod and the second pad are opposite to each other in the optical axis direction.

7. The mirror support according to claim 1, wherein at least one of the first-pad elastic body, the second-pad elastic body, the first-rod elastic body, and the second-rod elastic body is formed of a plate-shaped elastic member and a rigid member.

8. The mirror support according to claim 1, wherein each of the first-pad elastic body and the second-pad elastic body is formed of a plate-shaped elastic member and a rigid member, and the plate-shaped elastic member is disposed at a position where the plate-shaped elastic member is deformed in a longitudinal direction of the arm.

9. The mirror support according to claim 1, wherein each of the first-rod elastic body and the second-rod elastic body is formed of a plurality of plate-shaped elastic members and a plurality of rigid members, and at least one of the plate-shaped elastic members is disposed at a position where the plate-shaped elastic member is deformed in a direction orthogonal to a longitudinal direction of the arm.

10. The mirror support according to claim 1, wherein each of the first-rod elastic body and the second-rod elastic body is formed of a plurality of plate-shaped elastic members and a plurality of rigid members, and at least one of the plate-shaped elastic members is disposed at a position where the plate-shaped elastic member is deformed in a longitudinal direction of the arm.

11. A mirror support mechanism comprising:
   the mirror support according to claim 1 comprising at least three mirror supports;
   the mirror in which a distance between the first pad and the second pad of the mirror supports adjacent to each other and a distance between the first pad and the second pad of the mirror support are equal to each other, and the first pad and the second pad are fixed on an identical circumference; and
   the support structure.

12. The mirror support mechanism according to claim 11, wherein the support structure includes a rectangular main body, first connectors formed on each of two long sides of two ends in a long side direction of the main body, and second connectors formed on each of two short sides of the main body,
   a first one of the first connectors and a second one of the first connectors that are formed on one of the long sides are connected to the first rod and the second rod that are connected to the arm,
   a third one of the first connectors formed on the other long side is connected to another first rod different from the first rod to which the first one of the first connectors is connected, and a fourth one of the first connectors formed on the other long side is connected to another second rod different from the second rod to which the second one of the first connectors is connected, and
   a first one of the second connectors formed on one of the short sides is connected to the second rod connected to the arm identical to that of the first rod to which the third one of the first connectors is connected, and a second one of the second connectors formed on the other short side is connected to the first rod connected to the arm identical to that of the second rod to which the fourth one of the first connectors is connected.

13. The mirror support mechanism according to claim 12, wherein the main body is a plate-shaped member.

14. The mirror support mechanism according to claim 12, wherein at least one of the first connector and the second connector has a shape protruding from the main body.

15. The mirror support mechanism according to claim 12, further comprising;
   the mirror;
   a mirror fixing unit fixing at least six locations at equal intervals on an identical circumference of the mirror; and
   the support structure supporting the mirror fixing unit,
   wherein each of the first connectors and each of the second connectors support the mirror fixing unit, and wherein
   each of the mirror and the support structure comprises an opening in a center, and the mirror fixing unit is disposed to avoid the opening of the mirror.

16. The mirror support mechanism according to claim 15, further comprising a fall prevention unit in which a base end is fixed to the support structure,
   wherein the base end of the fall prevention unit is fixed to the opening of the support structure,
   the fall prevention unit includes a front end projecting on a mirror surface side of the mirror through the opening of the mirror,
   a diameter of the front end is larger than a diameter of the opening of the mirror, and
   a gap exists between the fall prevention unit and the mirror.

* * * * *